US008655740B2

(12) United States Patent
Kameyama

(10) Patent No.: US 8,655,740 B2
(45) Date of Patent: Feb. 18, 2014

(54) INFORMATION PROVIDING APPARATUS AND SYSTEM

(75) Inventor: Shogo Kameyama, Chiryu (JP)

(73) Assignee: Denso Corporation, Kariya (JP)

( * ) Notice: Subject to any disclaimer, the term of this patent is extended or adjusted under 35 U.S.C. 154(b) by 193 days.

(21) Appl. No.: 13/199,280

(22) Filed: Aug. 24, 2011

(65) Prior Publication Data
US 2012/0054054 A1 Mar. 1, 2012

(30) Foreign Application Priority Data

Aug. 31, 2010 (JP) .................................. 2010-194683

(51) Int. Cl.
G06Q 30/00 (2012.01)

(52) U.S. Cl.
USPC ......................................... 705/26.1; 705/27.1

(58) Field of Classification Search
USPC ................................. 705/26.1, 27.1
See application file for complete search history.

(56) References Cited

U.S. PATENT DOCUMENTS

| 6,340,935 | B1 * | 1/2002 | Hall | ........................... 340/932.2 |
| 7,054,723 | B2 | 5/2006 | Seto et al. | |
| 7,856,311 | B2 | 12/2010 | Matsuura et al. | |
| 2004/0243304 | A1 | 12/2004 | Kato | |
| 2009/0295558 | A1 | 12/2009 | Kameyama | |
| 2009/0318777 | A1 | 12/2009 | Kameyama | |

FOREIGN PATENT DOCUMENTS

| JP | 2002-140362 | 5/2002 |
| JP | 2003-276470 | 9/2003 |
| JP | 2004-150853 | 5/2004 |
| JP | 2004-362065 | 12/2004 |
| JP | 2005-149073 | 6/2005 |
| JP | 3722444 | 11/2005 |
| JP | 2007-163404 | 6/2007 |
| JP | 2007-264764 | 10/2007 |
| JP | 2008-293102 | 12/2008 |
| JP | 2009-294790 | 12/2009 |
| JP | 2009-294791 | 12/2009 |

OTHER PUBLICATIONS

Ruff, Marcia, Is a car-navigation system worth the money? Medical Economics75.1 (Jan. 12, 1998): 84-96, downloaded from ProQuestDirect on the Internet on Jul. 1, 2013, 4 pages.*
Office Action mailed May 15, 2012 in corresponding Japanese Application No. 2010-194683 (with English translation).

* cited by examiner

Primary Examiner — James Zurita
(74) Attorney, Agent, or Firm — Harness, Dickey & Pierce, PLC

(57) ABSTRACT

An information providing system is disclosed. The system includes a management apparatus having a database storing facility-event information of facilities or events, and a portable apparatus communicatable with the management apparatus. The portable apparatus sets each place, at which a movement stop time exceeds a prescribed staying time, as a stay place. The management apparatus estimates that a living area of a user of the portable apparatus is a collective area covering all of the stay places of the user. The management apparatus sets the collective area as the search scope, extracts the facility-event information matching the search scope from the database, and transmits the extracted facility-event information to the portable apparatus.

26 Claims, 9 Drawing Sheets

|  | PHYSICAL (BODY) 3A | MENTAL (HEAD) 3B | 3 |
|---|---|---|---|
| OUTPUT (USE) | SWIMMING SKIING | EDUCATION MATERIAL GAME | |
| INPUT (REST) | MEAL HOT SPRING | CLASSIC MUSIC ART | |

3C — 3D

INFORMATION PROVIDING APPARATUS AND SYSTEM

CROSS REFERENCE TO RELATED APPLICATION

The present application is based on and claims priority to Japanese Patent Application No. 2010-194683 filed on Aug. 31, 2010, disclosure of which is incorporated herein by reference.

TECHNICAL FIELD

The present invention relates to an information providing apparatus and an information providing system for providing information about a facility or an event to a user.

BACKGROUND

An information providing system including an in-vehicle apparatus mounted to a vehicle and a management apparatus installed to an external information center is known. In the system, the in-vehicle apparatus and the management apparatus communicate with each other, thereby providing facility-event information, which is information about a facility or an event, to a user.

In this kind of information providing system, the management apparatus extracts the facility-event information, e.g., the facility-event information that matches a condition "within a radius of X km from the present position", from a database and transmits the extracted facility-event information. The in-vehicle apparatus receives the facility-event information from the management apparatus, and provides the facility-event information to the user (cf. Patent Document 1 for example).

Patent Document 1: JP-2008-293102A

Discussion will be given based on findings of the inventor of the present application.

In a conventional information providing system, although the facility-event information corresponding to a facility or an event located near the present position of a vehicle can be provided to a user, it is doubtful whether this facility-event information is useful to the user because this facility-event information is merely extracted according to a distance-based search scope.

Specifically, the facility-event information provided to a user in a conventional information providing system may include information that is unwanted despite "within a radius of X km from the present position". Alternatively, the facility-event information provided to a user may fail to include information that is useful despite "X km or more distant from the present position".

SUMMARY

In view of the foregoing, it an objective of the present disclosure to provide an information providing apparatus and system that can provide information useful to a user in a rational manner, and can have high usability.

According to a first example of the present disclosure, an information providing apparatus for providing facility-event information is provided. The information providing apparatus includes an information storage, a present position acquisition unit, a search scope setting unit, an information extraction unit, an information indicating unit, and a stay place setting unit. The information storage stores the facility-event information of facilities or events while associating the facility-event information of the facilities or events with respective location data of the facilities or events. The present position acquisition unit acquires present position information indicating present position of the information providing apparatus. The search scope setting unit sets a search scope parameterized by the location data, based on the present position information acquired by the present position acquisition unit. The information extraction unit extracts, from the information storage, the facility-event information that matches the search scope set by the search scope setting unit. The information indicating unit provides at least some of the facility-event information extracted by the information extraction unit, to a user of the information providing apparatus. The stay place setting unit measures, based on the present position information acquired by the present position acquisition unit, a movement stop time defined as a period of time from when movement of the information providing apparatus stops to when the movement of the information providing apparatus restarts. The stay place setting unit sets each place, at which the measured movement stop time exceeds a prescribed staying time, as a stay place. The search scope setting unit estimates that a living area of the user is a collective area covering all of the stay places of the user based on the location data corresponding to the stay places set by the stay place setting unit. The search scope setting unit sets the collective area as the search scope.

According to a second example of the present disclosure, an information providing system for providing facility-event information is provided. The information providing system includes a management apparatus that includes a database, the database storing the facility-event information of facilities or events while associating the facility-event information of the facilities or events with respective location data of the facilities or events. The information providing system further includes and a portable apparatus that communicates with the management apparatus. The portable apparatus acquires present position information indicating the present position of the portable apparatus, transmits portable-source information, which is based on the present position information, to the management apparatus, and provides, to a user of the portable apparatus, at least some of the facility-event information transmitted from the management apparatus. The management apparatus sets, based on the portable-source information transmitted from the portable apparatus, a search scope parameterized by the location data. The management apparatus extracts the facility-event information matching the search scope from the database, and transmits the extracted facility-event information to the portable apparatus. The portable apparatus measures, based on the present position information, a movement stop time defined as a period of time from when movement of the portable apparatus stops to when the movement of the portable apparatus restarts. The portable apparatus sets each place, at which the movement stop time exceeds a prescribed staying time, as a stay place, and transmits place information indicating each stay place to the management apparatus. The management apparatus estimates, based on the location data corresponding to respective stay places transmitted from the portable apparatus, that a living area of the user is a collective area covering all of the stay places of the user. The management apparatus sets the collective area as the search scope.

According to a third example of the present disclosure, an information providing system for providing facility-event information is provided. The information providing system includes a management apparatus that includes a database. The database storing the facility-event information of facilities or events while associating the facility-event information of the facilities or events with respective location data of the facilities or events. The information providing system further includes and an in-vehicle apparatus that is mounted to a vehicle and communicatable with the management apparatus. The in-vehicle apparatus acquires present position information indicating present position of the vehicle, transmits vehicle source information, which is based on the present position information, to the management apparatus, and provides at least some of the facility-event information transmitted from the management apparatus, to a user driving the vehicle. The management apparatus sets, based on the vehicle source information transmitted from the in-vehicle apparatus, a search scope parameterized by the location data, extracts the facility-event information matching the search scope from the database, and transmits the extracted facility-event information to the in-vehicle apparatus. The in-vehicle apparatus measures a parking time of the vehicle, sets each place, at which the parking time exceeds a prescribed staying time, as a stay place based on the present position information, and transmits place information indicating each stay place to the management apparatus. The management apparatus estimates that a living area of the user is a collective area covering all of the stay places of the user, based on respective location data corresponding to the stay places transmitted from the in-vehicle apparatus. The management apparatus sets the collective area as the search scope.

According to a forth example of the present disclosure, an information providing system for providing facility-event information is provided. The information providing system includes a management apparatus that has a database that stores the facility-event information of facilities or events while associating the facility-event information of the facilities or events with respective location data of the facilities or events. The information providing system further includes a portable device that is communicatable with the management apparatus. The portable apparatus acquires present position information indicating present position of the portable apparatus, transmits position-based information, which is based on the present position information, to the management apparatus, and provides, to a user of the portable apparatus, at least some of the facility-event information transmitted from the management apparatus. The management apparatus sets, based on the position-based information transmitted from the portable apparatus, a search scope parameterized by the location data, extracts the facility-event information that matches the search scope from the database, and transmits the extracted facility-event information to the portable apparatus. The portable apparatus measures, based on the present position information, a movement stop time defined as a period of time from when movement of the portable apparatus stops to when the movement of the portable apparatus restarts, and sets each place, at which the movement stop time exceeds a prescribed staying time, as a stay place. The portable apparatus estimates that a living area of the user is a collective area covering all of the stay places of the user, from respective location date corresponding to the stay places. The portable apparatus transmits area information, which indicates the estimated living area, to the management apparatus. The management apparatus sets the living area of the user as the search scope based on the area information received from the portable apparatus.

According to a fifth example of the present disclosure, an information providing system for providing facility-event information is provided. The information providing system includes a management apparatus that has a database that stores the facility-event information of facilities or events while associating the facility-event information of the facilities or events with respective location data of the facilities or events. The information providing system further includes an in-vehicle apparatus that is mounted to a vehicle and is communicatable with the management apparatus. The in-vehicle apparatus acquires present position information indicating present position of the vehicle, transmits vehicle source information, which is based on the present position information, to the management apparatus, and provides, to a user driving the vehicle, at least some of the facility-event information transmitted from the management apparatus. The management apparatus sets, based on the vehicle source information transmitted from the in-vehicle apparatus, a search scope parameterized by the location data, extracts the facility-event information that matches the search scope from the database, and transmits the extracted facility-event information to the in-vehicle apparatus. The in-vehicle apparatus measures a parking time of the vehicle. The in-vehicle apparatus sets each place, at which the parking time of the vehicle exceeds a prescribed staying time, a stay place based on the present position information The in-vehicle apparatus estimates that a living area of the user is a collective area covering all of the stay places of the user, from respective location date corresponding to the stay places. The in-vehicle apparatus transmits area information indicating the living area of the user. The management apparatus sets the living area of the user as the search scope based on the area information received from the in-vehicle apparatus.

According to the above information providing apparatus and system, it is possible to provide information useful to a user in a rational manner. The above information providing apparatus and system can have high usability.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The exemplary embodiments are described below with reference to the accompany drawings.

[Configuration Outline]

Figure 1:
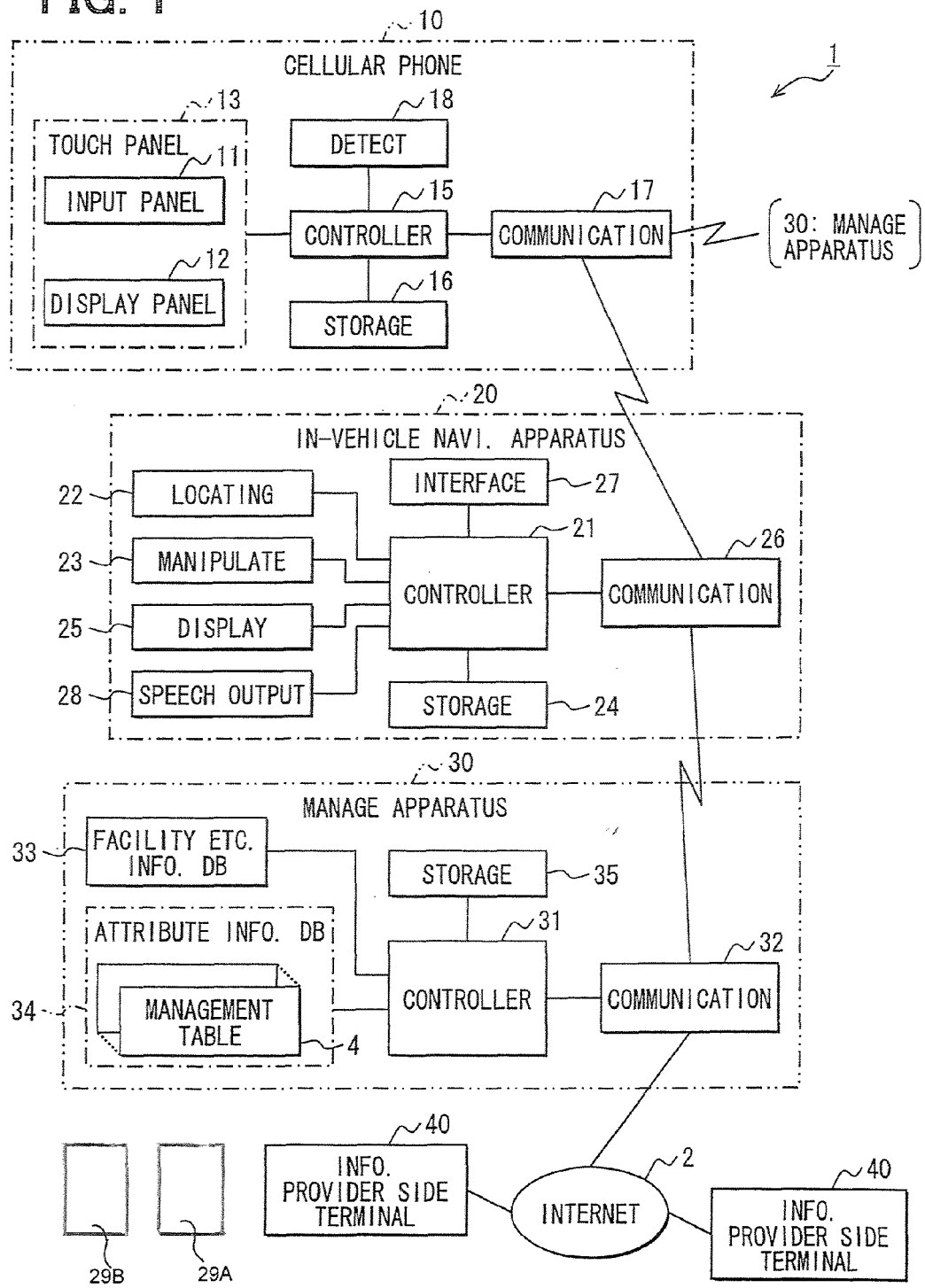
FIG. 1 is a block diagram illustrating an information providing system.

FIG. 1 is a block diagram illustrating a configuration of an information providing system 1 according to one embodiment.

As shown in FIG. 1, the information providing system 1 includes a cellular phone 10, an in-vehicle navigation apparatus 20 mounted to a vehicle, and a management apparatus 30 installed in an information center, which may be a facility of an operator (or host) of the information providing system 1. The cellular phone 10 is carried by the user who drives the vehicle.

Next, configurations of the cellular phone 10, the in-vehicle navigation apparatus 20 and the management apparatus 30 of the information providing system will be specifically described.

[Configuration of Cellular Phone 10]

The cellular phone 10 of the present embodiment may be a smart phone. The cellular phone 10 includes a touch panel portion 13, in which the input panel 11 for receiving user manipulation is integrally arranged on a surface of a display panel 12. A typical smart phone of these days has such standard functions as a telephone call function, a mail function, a browser function, and some of application functions (a word processor function, a spreadsheet function, an electronic banking function, etc.), and such additional functions as a game function, a camera function, an image editing function, a moving-image-reproduction function, and a music reproduction function. The above addition functions may further include application functions. The cellular phone 10 of the present embodiment is assumed to have the above functions.

In addition to the touch panel portion 13, the cellular phone 10 further includes a controller 15 for implementing the above and other functions, a storage 16 for storing a variety of information, a communication device 17 for wirelessly communicating with the in-vehicle navigation apparatus 20 and the management apparatus 30, and a detector 18 with various sensors.

The display panel 12 of the touch panel portion 13, which may be a known one, displays various images, movies and texts etc. The input panel 11 of the touch panel portion 13 receives touch manipulations at places corresponding to various icons on the display panel 12. An employed operating principle of the input panel 11 may be a matrix switch type, a resistance film type, a surface-acoustic-wave type, an infrared type, an electromagnetic induction type, a capacitive sensing type, or the like.

The controller 15 includes a microcomputer with a CPU (central processing unit), ROM (read-only memory), RAM (random access memory), I/O (input/output), a bus line connecting the foregoing components, and the like. The controller 15 performs various processes according to programs stored in the RAM etc.

The storage 16 can store various information. In the storage 16, a user ID for identification of the user is previously stored. The storage 16 has a pre-prepared area for storing function history information. The function history information is recorded by the controller 15 and includes at least information on: a date-and-time (i.e., a date-and-time of usage) when a process of performing the additional function is initiated and ended; and a time of usage of the additional function. The storage 16 further stores various keywords, which are associated with the facility-event information or needed to identify an object of user's interest. In addition, the storage 16 further stores specific waveform patterns, which are pre-set using an algorithm for analyzing someone's feelings from frequencies of his or her speech, and which are waveform patterns when people feels "pleasant" at a high level. This level of "pleasant" is also referred to hereinafter as "a degree of pleasant".

The communication device 17 includes a short-range wireless communication portion for wirelessly communicating with the in-vehicle navigation apparatus 20, and a wide-area wireless communication portion for wirelessly communicating with the management apparatus 30. The short-range wireless communication portion can perform communications in a communication area (area where a short-range wireless communication is performable) that cover at least all of a compartment of the vehicle equipped with the in-vehicle navigation apparatus 20. For example, the short-range wireless communication portion may use Bluetooth (registered trademark), wireless LAN, weak wireless communications, or the like. The wide-area wireless communication portion can perform communications in a communication area that a base radio station covers for relaying communications with the management apparatus 30. In the present embodiments, the wide-area wireless communication portion uses wireless data communications via a cellular network.

The detector 18 includes a GPS (Global Positioning System) sensor for receiving a radio wave (GPS signal) from GPS satellites, a speed sensor for detecting a velocity along three axes perpendicular to each other, a gyro-sensor for detecting an angular velocity around three axes, i.e., roll, yaw and pitch, a geomagnetic sensor for detecting an angle of direction in a three-dimensional space from geomagnetism, and the like. The detector 18 detects the present position (location), a movement speed and the like of the cellular phone 10 while compensating respective errors of the above sensors.

Moreover, the detector 18 includes further includes sensors for detecting temperature, humidity, atmospheric pressure, and luminance, respectively. As well as signals (detection signals) indicating the present position and the movement speed of the cellular phone 10, the detector 18 periodically inputs signals (detection signals) indicating the detected values of the temperature, the humidity, the atmospheric pressure, and the luminance to the controller 15.

[Configuration of In-Vehicle Navigation Apparatus 20]

The in-vehicle navigation apparatus 20 constitutes what is called a navigation system, which searches for an optimal route to a destination point and provides travel guidance on the route. The in-vehicle navigation apparatus 20 can function as an in-vehicle apparatus. This in-vehicle navigation apparatus 20 is used in a state of being mounted to the vehicle. When multiple vehicles use the information providing system 1, the in-vehicle navigation apparatus 20 is mounted to each of the multiple vehicles.

The in-vehicle navigation apparatus 20 includes a controller 21 for controlling generally all of operations of the in-vehicle navigation apparatus 20, a position detection device 22 for detecting present position of the vehicle, a manipulation device 23 for receiving manipulation from the user, a storage 24 for storing various data, a display device 25 for displaying various information, a communication device 26 for wirelessly communicating with the cellular phone 10 and the management apparatus 30, an interface 27 for having a connection to the cellular phone 10, and a speech output device 28 for outputting various speeches.

Moreover, the in-vehicle navigation apparatus 20 is connected with various sensors 29A in order to detect amounts of various operations which the user performs in relation to driving the vehicle. The various sensors include pressing down amount sensors for detecting amounts of press-down of an accelerator pedal and a brake pedal, a steering operation amount sensor for detecting an amount of operation of a steering wheel, and the like. In order to detect an activation degree indicating activeness of user's sympathetic nervous and a pleasant degree indicating user's emotion in part, the in-vehicle navigation apparatus 20 is connected with physiological sensors 29B for detecting a electrocardiograph value, heart rate etc., and an image sensor for detecting the number of times (blink rate) the user blinks, pupil size, and direction of eyes. The physiological sensor may detect the electrocardiographic value based on an electric potential difference generated in response to contact of a right hand and a left hand of the user with a pair of electrodes, which are arranged along a circumferential direction of a steering wheel. Further, the physiological sensor may detect the heart rate from a pulse rate based on a light reception amount change that is generated in response to a contact of a fingertip of the user with a photoelectric element, which is arranged at a predetermined place on an inner surface of the steering wheel. To detect user's breathing rate, the physiological sensor may include a sensor to be placed in the vicinity of a nose or a mouth of the user.

The controller 21 includes a computer with a CPU, a ROM, a RAM, an I/O and a bus line connecting the foregoing components. The controller 21 performs various processes according to programs stored in the ROM, an external storage device or the like. The controller 21 performs navigation-related processes such as, for example, a map display process for displaying a map on the display device 25 based on map data stored in the storage 24, a route retrieval process for retrieving an optimum route from the present position to a destination point, a travel route guidance process for performing a travel guidance along the retrieved optimum route via the display device 25 and the speech output device 28, and the like. Further, the controller 21 performs a process for acquiring information about a user available facility or event from the management apparatus 30, and providing the information to the user. The information about a facility or an event is also referred to as "facility-event information". Details of this process etc. will be described later.

The position detection device 22 includes a GPS receiver for receiving radio wave from GPS satellites via a GPS antenna to detect the position etc. of the vehicle, a gyroscope for outputting a detection signal depending on angular velocity of the vehicle with rotation motion, a speed sensor for outputting a detection signal depending on speed of the vehicle, and the like. Since the GPS antenna and the above sensors have respective errors different in nature from each other, the GPS antenna and the other sensors are used while compensating each other to acquire present position information indicating the present position of the vehicle.

The manipulation device 23 is manipulatable by the user, and includes a touch panel, a mechanical key switch or the like. The touch panel is integrated with a display screen of the display device 25. The key switch is arranged in a periphery of the display device 25.

The storage 24 stores a data for map matching for improvement of position detection accuracy, a map data, a program for operation of the in-vehicle navigation apparatus 20, and the like. In addition, the storage 24 has an area for storing the facility-event information etc. transmitted from the management apparatus 30. Moreover, a vehicle ID for identification of the vehicle is pre-stored in the storage 24.

The display device 25 is a color display device having a display screen such as a liquid crystal display and the like. The display device 25 can display various images on the display screen in accordance with an input of an image or video signal from the controller 21. When the vehicle is traveling, the display device 25 displays, for example, a navigation window while superimposing additional data such as: a mark indicating the present position, which is identified from (i) the present position of the vehicle detected by the position detection device 22 and (ii) the map data inputted from the storage 24; a guidance route to the destination; name; mark symbol of various landmarks; and the like. The display device 25 can further display various information such as the facility-event information and the like extracted from the storage 24.

The communication device 26 includes a short-range wireless communication portion for wireless communicating with the cellular phone 10, and a wide-area wireless communication portion for wirelessly communicating with the management apparatus 30. Details of these portions can be similar to those of the cellular phone 10.

The interface 2 includes a connection device for having a wired connection to the cellular phone 10 to realize what is called "handsfree communications". The interface 2 outputs speech spoken by other party to an in-vehicle speaker via the speech output device 28. The interface 2 is configured to acquire various information by communicating with the cellular phone 10 in a wired-manner.

[Configuration of Management Apparatus 30]

The management apparatus 30 controls and manages information on users of the information providing system 1 and the facility-event information to be provided to users. The management apparatus 30 is installed in an information center, which may be a facility of an operator (host) of the information providing system 1. As the management apparatus 30, a single apparatus is commonly used for multiple in-vehicle navigation apparatuses 20.

The management apparatus 30 includes a controller 31 for controlling generally all of operations of the management apparatus 30, a communication device 32 for communicating with an external device, a facility-event information database (DB) 33 for storing a variety of facility-event information, an attribute information database (DB) 34 for storing a management table 4 indicating various information associated with user attributes, and a storage 35 for storing other various information including the map data.

The controller 31 includes a computer with a CPU, ROM, RAM, I/O, a bus line connecting the foregoing components, and the like. The controller 31 performs various processes according to programs stored in the RAM or an external storage device. The external storage device pre-stores a map date while associating location data of each facility or event with name, address, phone number etc. of the facility or event.

The communication device 32 performs data communications with the multiple in-vehicle navigation apparatuses 20 and cellular phones 10 using the cell phone network, DSRC (Dedicated Short Range Communication), or the like in a wireless manner. Further, the communication device 32 performs data communications with multiple information provider terminals 40, which are terminals used by an operator of each facility etc., or used by other users.

The facility-event information DB 33 stores the facility-event information of multiple facilities or events in such way that location data of each facility or event is associated with user ID of information provider (informant). The facility-event information can be updated or registered from the information provider terminal 40 and the cellular phone 10 when the information provider terminal 40 is connected to and communicatable with the management apparatus 30 via Internet or when the cellular phone 10 is connected to and communicatable with the management apparatus 30 via the cell phone network. Contents written on SNS (Social Networking Site) such as a Blog or Twitter can be used for the above kind of facility-event information.

The facility-event information is structured into three levels of hierarchical information elements different in information amount from each other. The three levels of hierarchical information elements are "label information", "headline information" and "detail information". The label information can be used to form an icon or the like that indicates that there is some information at the place of the facility or event when the facility-event information of this facility or event is provided to a user. The label information is made of a relatively small amount of data as compared with the headline information and the detail information. The headline information can be used to form a headline or a tile when the facility-event information is provided to a user. The headline information is made of a relatively small amount of data as compared with the detail information. The detail information can be used to form detailed content when the facility-event information is provided to a user. A main component of the detail information may be text data and image data. The detail information include a review (e.g., rating) or a comment by a user who actually had visited on the facility or event.

Figures 2A, 2B:
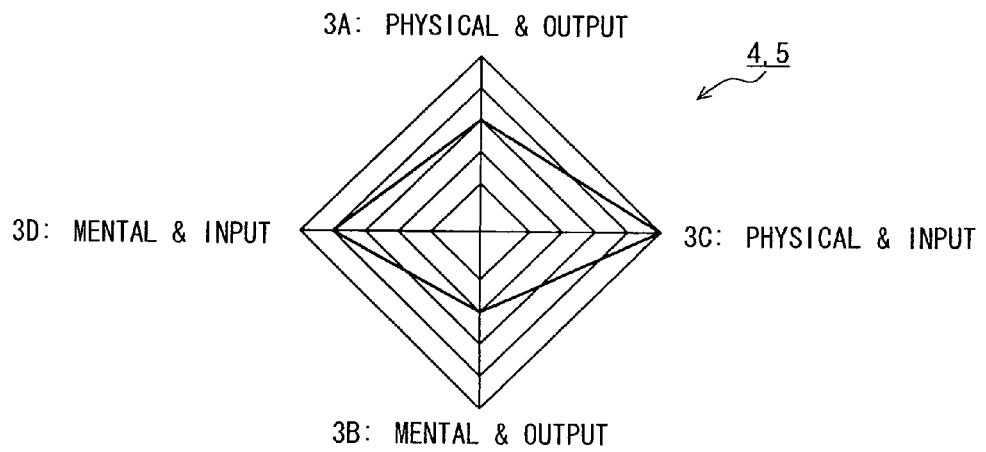
FIG. 2A is a diagram illustrating attribute groups.
FIG. 2B is a diagram illustrating an attribute radar chart in a management table.

The facility-event information is stored in the facility-event information DB 33 while being classified into pre-scribed "attribute groups" 3 according to type of its information content. In the present embodiment, the attribute groups 3 include: "a physical use group 3A" made of information contents mainly associated with use of one's physical body (physical activity); "a mental use group 3B" made of information content mainly associated with use of one's head (mental activity); "a physical rest group 3C" made of information contents mainly associated with rest of one's body; and "a mental rest group 3D" made of information contents mainly associated with rest of one's head. For example, as shown in FIG. 2A, the physical use group 3A includes the facility-event information associated with swimming, skiing and the like. The mental use group 3B includes the facility-event information associated with educational materials, games and the like. The physical rest group 3C includes the facility-event information associated with meal (e.g., dinner), hot spring and the like. The mental rest group 3D includes the facility-event information associated with classic music, art, and the like.

The attribute information DB 34 includes multiple management tables 4 for respective multiple users on a user-by-user basis. A variety of information transmitted from the in-vehicle navigation apparatus 20 or the cellular phone 10 is recorded and stored in the management table 4. The attribute information DB 34 further includes multiple attribute radar charts 5 for respective multiple users on a user-by-user basis. Depending on contents of the various information stored in the management table 4, each attribute radar chart 5 indicates a tendency of individual user' interests by weighting respective attribute groups 3A to 3D (see FIG. 2B). The above-described vehicle ID, a user ID, a phone number of the cellular phone 10 possessed by the user, a mail address, and the like are pre-registered in the corresponding management table 4.

[Control Process of Cellular Phone 10]

Processes performed by the cellular phone 10 will be described.

[1. Facility-Event Information Providing Process]

In response to user manipulation on the touch panel portion 13 of the cellular phone 10 and start up of the browser function of the cellular phone 10, the facility-event information providing process is started. Using the browser function, the controller 15 accesses a homepage (web-site) operated by the information center. Then, the user may input name, review (rating etc.), comment (impression etc.), or image (including movie) in the homepage and may make en enter manipulation. In this case, the controller 15 transmits the inputted information as the facility-event information to the management apparatus 30 via the communication device 17 together with the user ID of the user. Alternatively, the user may write down a message on another website such as Twitter, Blog and the like. In this case, the controller 15 may extract a keyword corresponding to one stored in the storage 16 from the message, and may transmits the information, which represents the message including the extracted keyword, as the facility-event information to the management apparatus 30 via the communication device 17 together with the user ID of the user. In this way, the user can provide the facility-event information to the information center by using the cellular phone 10.

[2. Sensor Information Providing Process]

In response to power on of the cellular phone 10 itself, this sensor information providing process is started. Based on the various detection signals periodically inputted from the detector 18, the controller 15 transmits sensor information together with the user ID of the user to the management apparatus 30 via the communication device 17. The sensor information includes information indicating the present position and the movement speed of the cellular phone 10, the temperature, the humidity, the atmospheric pressure and the luminance at the present position, and the like. When the telephone call function of the cellular phone 10 is started up in response to user's manipulation on the touch panel portion 13, the information indicating loudness of telephone call speech inputted into the cellular phone 10 is incorporated into the sensor information and transmitted to the management apparatus 30. In this way, it becomes possible to automatically transmit the sensor information at the present position of the cellular phone 10 to the management apparatus 30, and thereby, it becomes possible to provide various information at each facility or event place to the information center.

[3. User Information Transmission Process]

Figure 3:
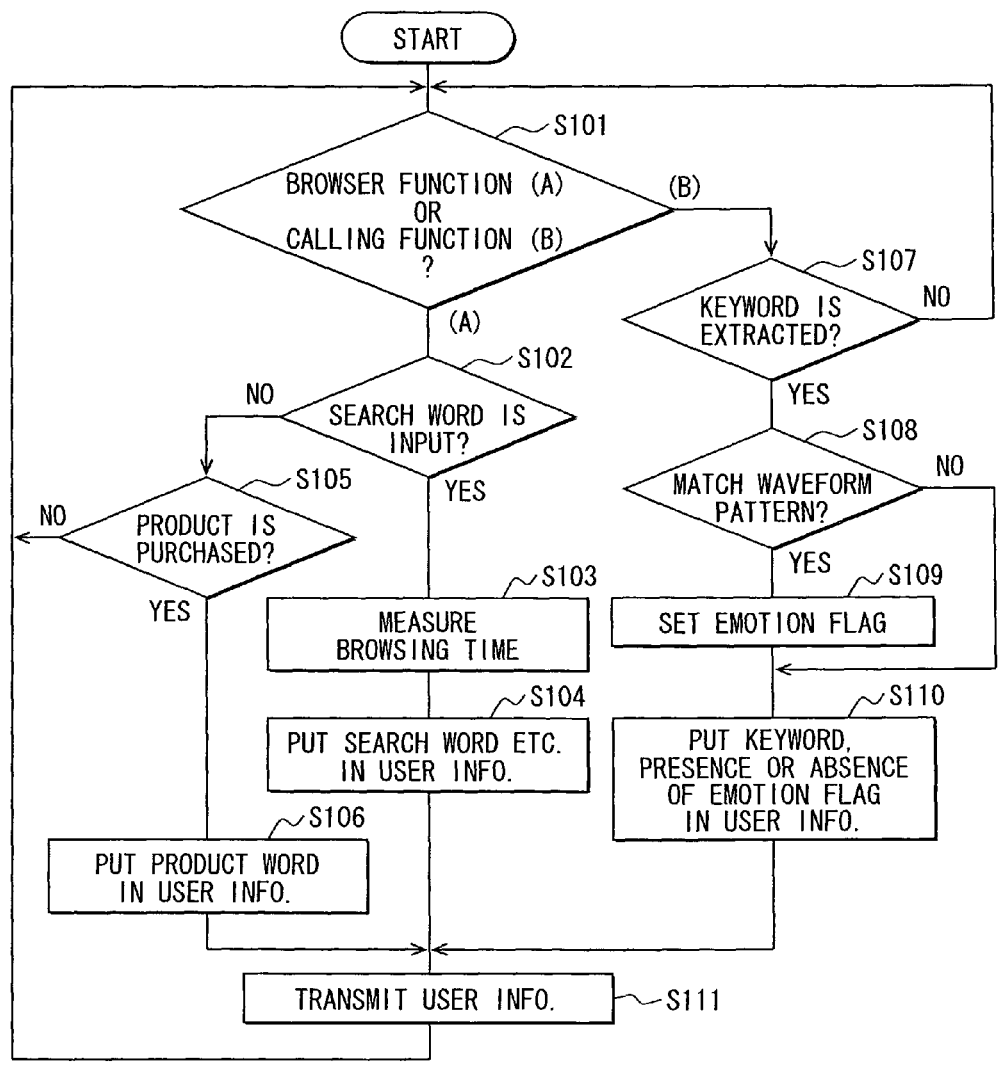
FIG. 3 is a flowchart illustrating a user information transmission process performed by a controller of a cellular phone.

FIG. 3 is a flowchart illustrating procedure of a user information transmission process performed by the controller 15 of the cellular phone 10.

Upon starting up the browser function or the telephone call function in response to user's manipulation on the touch panel portion 13 (corresponding to S101), the controller 15 starts the user information transmission process.

When the start up of the browser function triggers a start of the user information transmission process ("A" at S101), the process proceeds to S102.

At S102, it is determined whether a search is conducted using an search engine on a homepage. In other words, it is determined whether a search word is inputted into the search engine. When it is determined that the search is conducted, corresponding to "YES" at S102, the controller 15 records a date, hour and time when the search word is inputted (a date-time of search, a time period of search) in the storage 16, and the process proceeds to S103. When it is determined that the search is not conducted, corresponding to "NO" at S102, the process proceeds to S105. In the above, it may be determined that the search word is inputted, when the search word corresponds to a keyword pre-stored in the storage 16.

At S103, the controller 15 measures and records a browsing time of a homepage (webpage) to which the user has moved using the search word at S102 via the search engine. The browsing time can be defined as a time period from the date-time of search to when the user goes to another website.

After S103, the process proceeds to S104. Note that the user may go to another website by selecting a favorite shortcut or directly inputting URL.

At S104, the controller 15 creates user information indicating (i) the search word and the date-time of search recorded in the storage 16 at S102 and (ii) the browsing time recorded at S103. After S104, the process proceeds to S111.

At S105, based on how the touch panel portion 13 is manipulated, it is determined whether a commercial product (including not only a product but also service) is purchased from the currently-viewed homepage over what is called Internet shopping. When it is determined that the commercial product is purchased, corresponding to "YES" at S105, the controller 15 extracts name of the purchased commercial product or a similar word from keywords pre-stored in the storage 16, and the process proceeds to S106. When it is determined that the commercial product is not purchased, corresponding to "NO" at S105, the process returns to S101. The name of the commercial product or a similar word to be extracted is also called herein "a commercial product word".

At S106, the controller 15 creates the user information indicating the commercial product word at S106, an amount of payment, (settlement amount), and a purchase date and time (settlement date and time).

Description returns to S101. When the start up of the calling function triggers the start of the user information transmission process (corresponding to "B" at S101), the process proceeds to S107.

At S107, the controller 15 recognizes the speech inputted into the cellular phone 10 when the user is in a telephone call, and the controller 15 determines whether the recognized speech in the telephone call contains a keyword stored in the storage 16. When it is determined that the speech contains the keywords (corresponding to "YES" at S107), the process proceeds to S108 after extracting the keyword. When it is determined that the speech does not contain the keyword, corresponding to "NO" at S107, the process returns to S101.

At S108, it is determined whether speech frequency at the time of user's utterance of the keyword recognized at 107 shows a waveform pattern pre-stored in the storage 16. When the speech frequency shows the waveform pattern pre-stored in the storage 16, the process proceeds to S109. When the speech frequency fails to show the waveform pattern pre-stored in the storage 16, the process proceeds to S110.

At S109, the controller 15 sets an emotion flag for the keyword recognized at S107. The emotion flag indicates that the keyword was uttered by the user with a pleasant feeling. The keyword uttered by the user with a pleasant feeling is also called herein "pleasant keyword". After S109, the process proceeds to S110.

At S110, the controller 15 creates the user information indicating the keyword extracted at S107, a count of keyword extraction, a date and time (hours) of keyword extraction, the other party in the telephone call (e.g., other party's phone number), duration of the telephone call, and the presence or absence of the emotion flag (which is to be at S109). After S110, the process proceeds to S111.

At S111, the user information created at S104, S106 or S111 is transmitted to the management apparatus 30 via the communication device 17 together with the user ID of the user. In this way, the user information, which indicates objects of user's interest etc., is automatically transmitted to the management apparatus 30, and thereby, a variety of information needed to grasp the attribute of the user is provided to the information center.

[4. History Transmission Process]

When the cellular phone 10 is connected to the in-vehicle navigation apparatus 20 in a wired manner or when the cellular phone 10 receives an information acquisition request from the in-vehicle navigation apparatus 20 via communication device 17, the history transmission process is started. The controller 15 reads out function history information from the storage 16, and transmits the read-out function history information to the in-vehicle navigation apparatus 20 in a wired manner or a wireless manner. The function history information describes a history of usages of functions of the cellular phone 10, e.g., a date and time of usage of the above-described additional function is used and a time period of usage of the additional function. An objective of transmission of the function history information to the in-vehicle navigation apparatus 20 will be described later.

[Control Processes of In-Vehicle Navigation Apparatus]

Next, processes performed by the in-vehicle navigation apparatus 20 will be described.

[1. Received Information Recording Process]

The received information recording process is started in response to the power on of the in-vehicle navigation apparatus 20 or the cellular phone 10. Until the in-vehicle navigation apparatus 20 establishes a communication with the cellular phone carried by the user, the controller 21 transmits the above-described information acquisition request via the communication device 26. When the controller 21 receives the function history information from the cellular phone 10, the controller 21 records the received function history information in the storage 24. Further, when the controller 21 receives the facility-event information from the management apparatus 30 via the communication device 26, the controller 21 records the facility-event information in the storage 24 in such a form that enables the facility-event information to be read out in units of the above-described label information, headline information and detail information. Further, when the controller 21 receives the below-described area information from the management apparatus 30 via the communication device 26, the controller 21 records the received area information in the storage 24 in such a format that enables a daily living area (ordinary living area) and a non-daily living area (extraordinary living area) of the user to be read out. The daily living area shows a scope of daily activities of the user, and the non-daily living area shows a scope of non-daily activities of the user. In the above-described way, the function history information from the cellular phone 10, and the facility-event information and the area information from the management apparatus 30 are recorded and stored in the storage 24. Among the information stored in the storage 24, the function history information and the area information are updated by latest received information, and the facility-event information may be deleted when the detail information is read out by the controller 21.

[2. Information Transmission Process]

Figure 4:
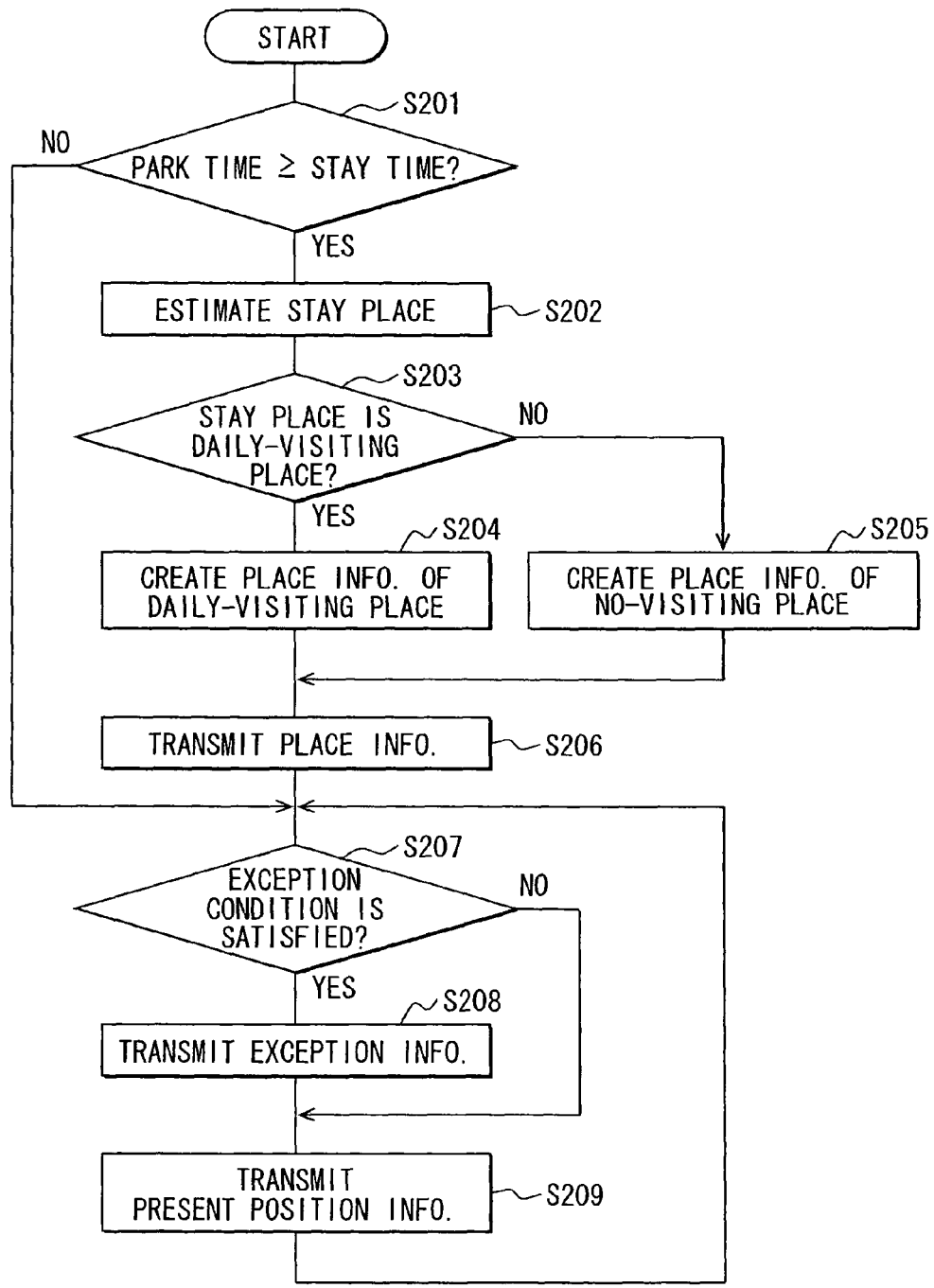
FIG. 4 is a flowchart illustrating an information transmission process performed by a controller of an in-vehicle navigation apparatus.
Figure 5:
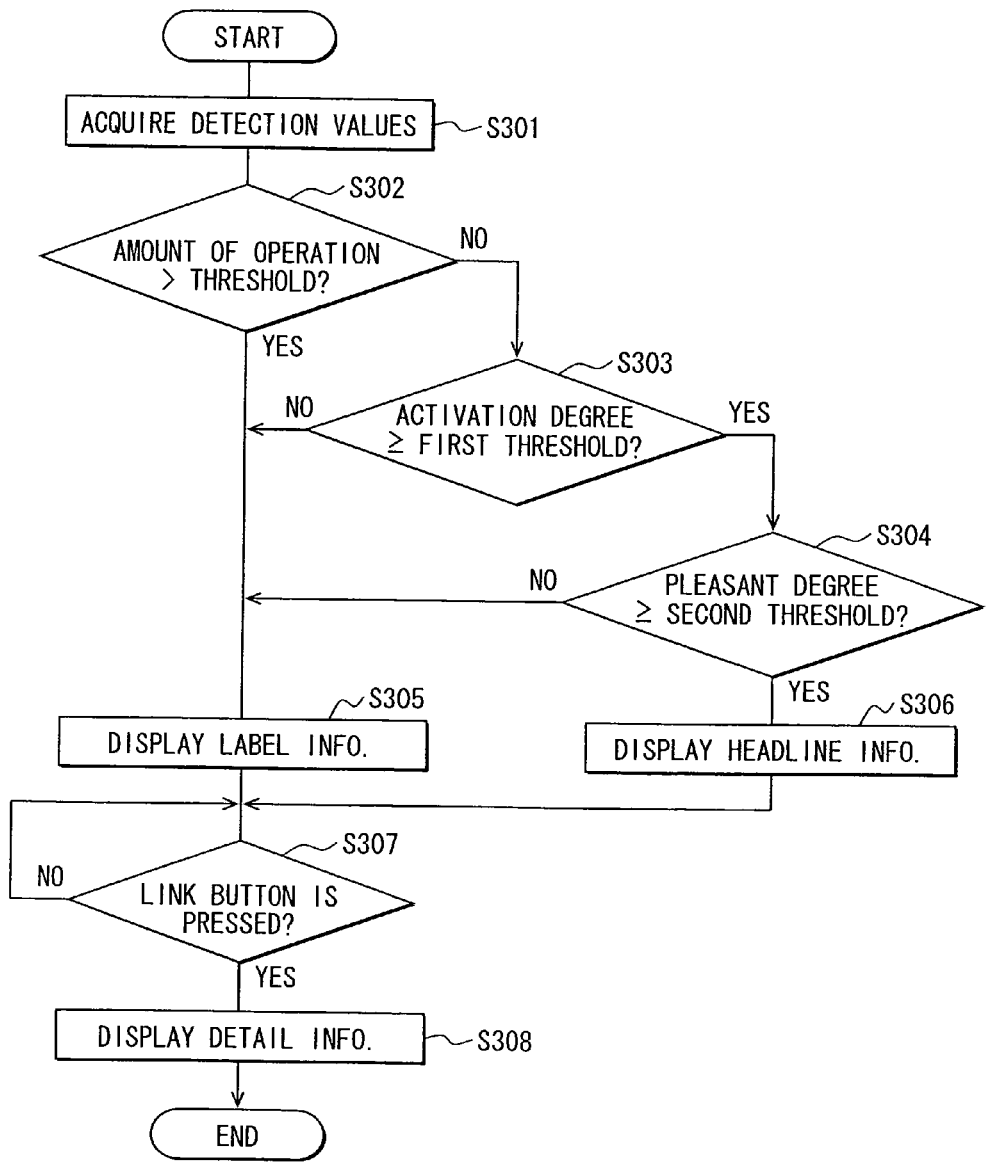
FIG. 5 is a flowchart illustrating an information providing process performed by the controller of the in-vehicle navigation apparatus.

FIG. 4 is a flowchart illustrating a procedure of the information transmission process performed by the controller 21 of the in-vehicle navigation apparatus 20.

The information transmission process is started in response to the power on of the in-vehicle navigation-apparatus 20. A date-time when the in-vehicle-navigation-apparatus 20 was powered off previous time is pre-stored as a parking start date-time in the storage 24. The parking start date-time was recorded by the controller 21.

Upon starting the information transmission process, the controller 21 first determines (S201) whether a parking time, which is from the parking start date-time pre-stored in the storage 24 to a parking end time, is greater than or equal to a prescribed staying time. In the above, the parking end time is a time when the power-one of the in-vehicle navigation apparatus 20 occurs as a trigger of the start of this information transmission process. When the parking time is determined to be greater than or equal to the prescribed staying time, corresponding to "YES" at S201, the process proceeds to S202. When the parking time is determined to not be greater than or equal to the prescribed staying time, corresponding to "NO" at S201, the process proceeds to S207.

At S202, the controller 21 sets the place, at which the vehicle has parked not less than the prescribed staying time, as a stay place of the user. In addition, the controller 21 estimates whether the stay place is a daily-visiting place or a non-daily-visiting place. In the above, the daily-visit place is a place to be visited routinely, such as home, commuting place, work place, school place, grocery shop (including supermarket etc.), lesson class place (including gym etc.) and the like. The non-daily-visiting place is a place to be visited not routinely, such as travel destination, business trip destination, and the like.

For example, based on the present position information acquired from the position detection device 22, the controller 21 records and stores the location date of the stay place in the storage 24 in conjunction with the above-described parking start time and parking end time. The controller 21 estimates based on the above stored data that the stay place is home, if the vehicle is periodically parked at the same stay place and if a time of day of parking the vehicle is midnight on weekdays. Alternatively, if the vehicle is periodically parked at the same stay place in the daytime on weekdays, and if the parking time is relatively long, the controller 21 estimates that a work time (or school time) is the parking time and a work place (or school place) is the stay place. Alternatively, for example, depending on a parking time at the same stay place where the vehicle is periodically parked, a park place (stay place) can be estimated as follows. If the parking time is relatively short, the parking time and the stay place are estimated as a shopping time and a grocery shop, respectively. If the parking time is longer than the shopping time and shorter than the work time, the stay place is estimated as a lesson class place.

At S203, it is determined whether the stay place estimated at S202 is the daily-visiting place. When the stay place estimated at S202 is determined to be the daily-visiting place, the controller 21 sets an daily flag, and the process proceeds to S204. The daily flag indicates that the stay place estimated at S202 is the daily-visiting place. When the stay place estimated at S202 is determined to not be the daily-visiting place, the process proceeds to S205.

At S204, the controller 21 creates place information (daily-visiting place information), which indicates the location data of the daily-visiting place, type of the place (e.g., home, work place, grocery shop, lesson class place etc.) and the park hours of the day. After S204, the process proceeds to S206.

At S205, based on the location data of the non-daily visiting place and the map data stored in the storage 24, the controller 21 creates the place information (stay information) that indicates: name and place of the facility or event as the travel destination or the business trip destination; a staying date-time; and a staying period.

At S206, the place information created at S204 or S206 is transmitted together with the vehicle ID of the vehicle to the management apparatus 30 via the communication device 26, and the process proceeds to S207. Through the above manner, the place information indicating the stay place of the user is automatically transmitted to the management apparatus 30, and thereby, the information needed to grasp the living area of the user is provided to the information center.

At S207, it is determined whether a prescribed exception condition is satisfied, based on at least one of the function history information stored in the storage 24, the present position information acquired from the position detection device 22, and the destination position in the above-described route retrieval process. When it is determined that the prescribed exception condition is satisfied, corresponding to "YES" at S207, the process proceeds to S208. When it is determined that the prescribed exception condition is not satisfied, corresponding to "NO" at S207, the process proceeds to S209.

For example, the prescribed exception condition is at least one of the followings: the time period of usage of the additional function of the cellular phone 10 within a given period of time prior to the user boarding the vehicle is longer than a predetermined threshold time; an acquisition time and data of the present position information shows a holiday or a day before a holiday; the vehicle travels along a travel route whose destination is home of the user; and the destination position is within the non-daily living area of the user, when the area information read out from the storage 24 is refereed.

At S208, the controller 21 creates exception information indicating that the exception condition is determined to be satisfied at S207. Further, together with the vehicle ID of the vehicle, the created exception information is transmitted to the management apparatus 30 via the communication device 26. After S208, the process proceeds to S209.

At S209, together with the vehicle ID of the vehicle, the present position information acquired from the position detection device 22 is transmitted to the management apparatus 30 via the communication device 26, and the process proceeds to S207. Through the above manner, the present position information indicating the present position of the user (or the exception information, depending on cases) is automatically transmitted to the management apparatus 30. All of the information needed to extract the facility-event information, which is to be provided to the user, is transmitted to the management apparatus 30.

This information providing process is started when the in-vehicle navigation apparatus 20 is powered on and the first facility-event information in the above-described received information recording process is recorded in the storage 24. Upon starting this process, the controller 21 first performs S301. At S301, based on the detection signal inputted from each detection sensor connected with the in-vehicle navigation apparatus 20, the controller 21 acquires detection values needed to estimate a load condition of the user who is driving the vehicle.

At S302, it is determined whether, of the detection values acquired at S301, operation amounts detected by the pressing down amount sensor and the steering wheel operation amount sensor exceed prescribed thresholds. When the operation amounts are determined to exceed the thresholds, corresponding to "YES" at S302, the process proceeds to S305. When the operation amounts are determined to not exceed the thresholds, corresponding to "NO" at S302, the process proceeds to S303.

At S303, a degree of increase in a specific value from a preset reference value of the user is calculated to be the above-described activation degree, and it is determined whether the calculated activation degree is greater than or equal to a predetermined threshold (called also "first threshold"). When it is determined that the calculated activation degree is greater than or equal to the predetermined threshold, corresponding to "YES" at S303, the process proceeds to S304. When it is determined that the calculated activation degree is less than to the predetermined threshold, corresponding to "NO" at S303, the process proceeds to S305. In the above, the specific value used to calculate the activation degree includes at least one of the detection values acquired at S301, such as the electrocardiographic value, the heart rate and the breathing rate detected with respective physiological sensors, and the blink rate (count) detected with the image sensor.

At S304, the above-described pleasant degree is set based on at least one of the pupil size, the direction of eyes and the user's speech (the speech uttered by the user), and it is determined whether the pleasant degree is greater than or equal to a predetermined threshold (called also "second threshold"). When it is determined that the pleasant degree is greater than or equal to the predetermined threshold, corresponding to "YES" at S304, the process proceeds to S306. When it is determined that the pleasant degree is less than the predetermined threshold, corresponding to "NO" at S304, the process proceeds to S305. In the above, the pupil size and the direction of eyes are ones of the detection values acquired at S301 and are detected with the image sensor, and, the user's speech is also another one of the detection values acquired at S301 and is inputted via the interface 27.

For example, the pleasant degree is set to a value higher than the second threshold, if the controller 21 recognizes at least one of the followings: the pupil of the user is enlarged to size larger than a predetermined value; the direction of eyes of the user points to a display site of the display device 25 more than a given period of time; and the speech uttered by the user at a time of the handsfree communications shows the above-described waveform pattern.

At S305, the controller 21 estimates that the load of the user at the time of driving is in a relatively large load state. Further, from the storage 24, the controller 21 extracts the label information as one of the hierarchical information elements that matches the above load condition in point of the amount of information, and displays the extracted label information on the display device 25. Further, in addition to the label information, the display device 25 displays a link button linked to the headline information or the detail information, each of which constitutes the facility-event information.

At S306, the controller 21 estimates that the load of the user at the time of driving is in a relatively small load state. Further, from the storage 24, the controller 21 extracts the head line information as one of the hierarchical information elements that matches the above load condition in point of the amount of information, and displays the extracted headline information on the display device 25. Further, in addition to the headline information, the display device 25 displays a link button linked to the detail information, which constitutes the facility-event information.

At S307 after S305 or S306, the controller 21 waits a predetermined period of time for the above-described link button to be manipulated via the manipulation device 23 by touch manipulation. When the link button is manipulated within the predetermined period, the process proceeds to S308. At S308, the controller 21 switches display of the display device 25 from the label information or the headline information into to the detail information.

A form of display of the facility-event information (each hierarchical information element) on the display device 25 may be the following. The facility-event information may be displayed on the map in the navigation window. Alternatively, the facility-event information may be separately displayed independently of the map. Alternatively, multiple types or pieces of the facility-event information may be simultaneously displayed or displayed in an order of increasing distance based on the present position of the vehicle. The facility-event information of multiple facility or events may be displayed in an order of increasing distance from the present position along the travel route in a traveling direction of the vehicle.

[Control Processes of Management Apparatus 30]

Processes performed by the management apparatus 30 will be described.

[1. Facility-Event Information Registration Process]

In response to power-on of the management apparatus 30, the facility-event information registration process is started. In response to receiving the facility-event information from the information provider terminal 40 or the cellular phone 10 via the communication device 32, the controller 31 records the facility-event information of facilities or events in the facility-event information DB 33 while associating the facility-event information of each facility or event with (i) the location data of the facility or event and (ii) an operator ID of the facility etc. or the above-descried user ID. If the facility-event information of the same place is already stored in the facility-event information DB 33, this memory information is updated. In the above, the operator ID is an ID for identification of the operator of the facility etc.

[2. Real-Time-Information Generation Process]

Figure 6:
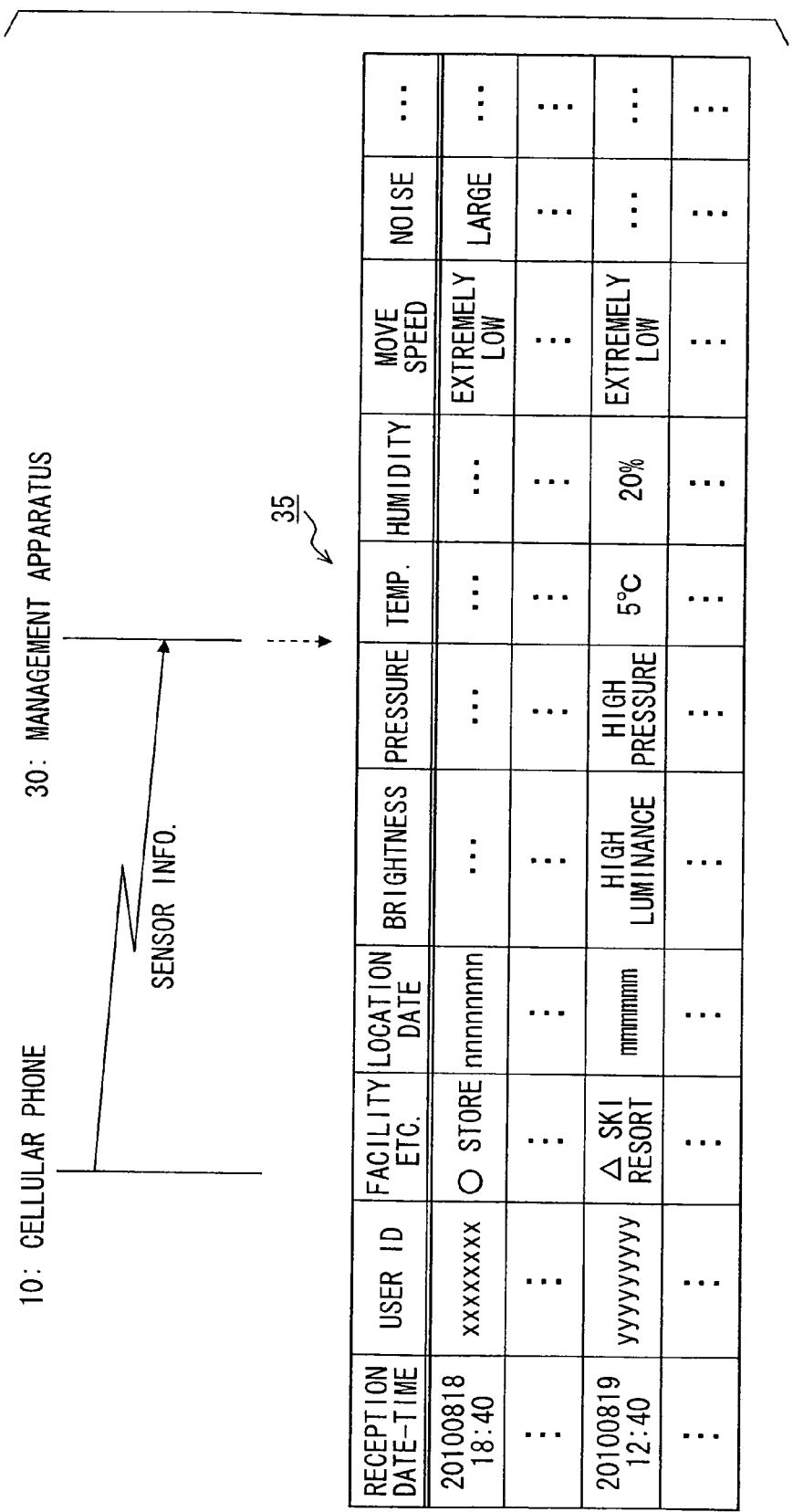
FIG. 6 is flowchart illustrating a real-time information creation process preformed by a controller of a management apparatus.

In response to power-on of the management apparatus 30, the real-time-information generation process is started. In response to reception of the sensor information from the cellular phone 10 via the communication device 32, the controller 31 records the sensor information in the storage 35 while associating the sensor information with a date and time of the reception of the sensor information and the user ID of the provide of the sensor information. For example, as shown in FIG. 6, the place of a facility or event corresponding to the present position of the cellular phone 10, the degrees of luminance (brightness) and atmospheric pressure, the temperature, the humidity, the movement speed, the degree of surrounding noise corresponding to loudness of the inputted speech, and the like are recorded and stored in the storage 35 based on the sensor information while being associated with the reception date-and-time and the user ID. Next, based on the above information, the controller 31 estimates a real-time situation of the facility or event place, and generates real-time information indicating a result of this estimation. For example, if the facility or event place is an indoor one such as a department store and the like, the controller 31 can estimate from the degree of noise whether many people are visiting. If the movement speed shows an extremely small speed, the controller 31 can estimate that the facility or event place is crowded. If the facility or event place is an outdoor one such as a skiing resort and the like, the controller 31 can estimate weather at that place from the luminance or humidity with respect to a time, and can estimate altitude of the place from the atmospheric pressure or the humidity (multiple different information is required). Furthermore, from the user IDs, the controller 31 can estimate what kind of people is actually visiting. Then, the real-time information indicating a result of the above-described estimation is recorded and stored in the facility-event information DB 33 in such way that the real-time information is included in the detail information of the facility-event information directed to the same facility or event as the real-time information. In this way, it is possible to give the cellular phone 10 a role of a kind of sensor for generating real-time information, and it is possible to bring diversity (variety) to contents of the facility-event information and thus it is possible to enrich contents to be provided to a user.

[3. Area Information Registration Process]

Figure 7:
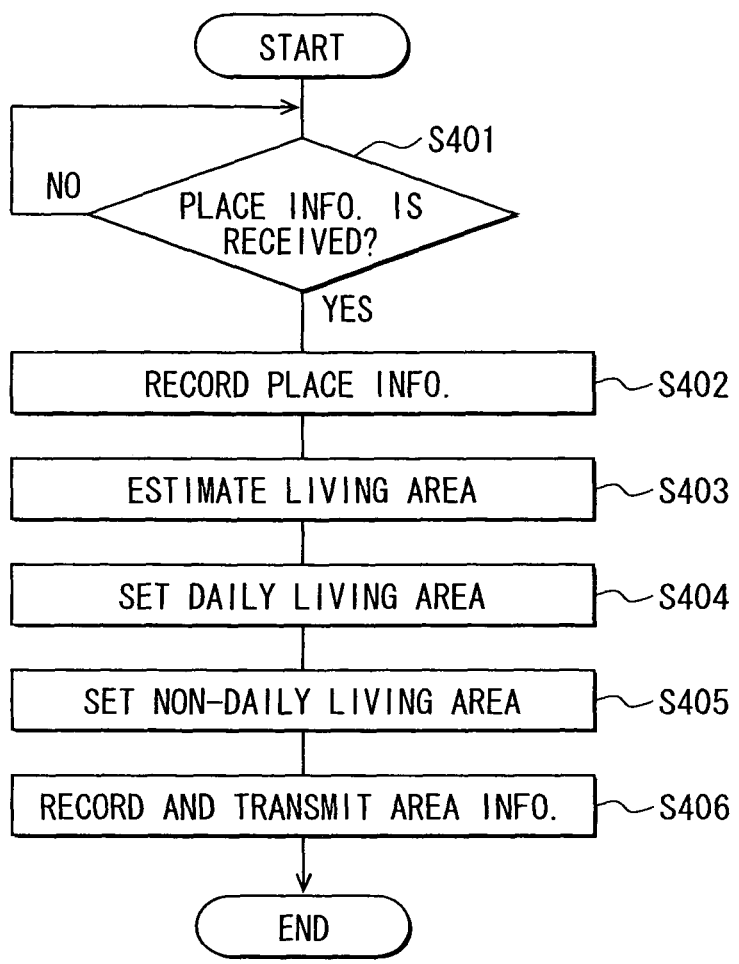
FIG. 7 is a flowchart illustrating an area information registration process performed by the controller of the management apparatus.

FIG. 7 is a flowchart illustrating procedure of the area information registration process performed by the controller 31 of the management apparatus 30.

The controller 31 starts this area information registration process in response to receiving the place information from the in-vehicle navigation apparatus 20 via the communication device 32 (S401: YES). At S402, in the storage 35, the controller 31 records and stores (i) the place information (location date of the stay place) received as a trigger for starting this process and (ii) the user ID transmitted together with this place information, so that the place information and the user ID are associated with each other. In the storage 35, each location data is stored so that for the user, living place and non-living place are distinguishable from each other, and type of living place (home, work place, grocery shop, lesson class place etc.) and type of non-living place (facility, event place etc.) are distinguishable from each other.

At S403, the controller 31 estimates that the living area of this user is a collective area covering all of the stay places of the user, based on respective location data corresponding to multiple stay places stored in the storage 35 in association with the user ID. In the present embodiment, an area whose diameter is between specific two stay places may be estimated as the living area. The specific two stay places are two stay places having the longest distance among the multiple stay places of the user.

At S404, the controller 31 estimates that a daily living area of this user is a collective area covering all of the daily-visiting places of the user, based on respective location data corresponding to multiple daily-visiting places stored in the storage 35 in association with the user ID. In the present embodiment, for all combinations of the daily-visiting places stored in the storage 35, the controller 31 calculates, by refereeing to the map data, a rational shortest route having one daily-visiting place as a departure point and another daily-visiting place as a destination point. In the above, the rational shortest route is a path that is shortest in terms of time, distance or cost. The controller 31 sets a collective area covering these multiple calculated routes as the above-mentioned daily-living area.

At S405, the controller 31 sets the following area as the non-daily living area of the user. The area set as the no-daily living area of the user is the living area of the user estimated at S403 except the daily living area of the user set at S404. In other words, the extraordinary living area is an area obtained by subtracting "a overlap between the living area of the user estimated at S403 and the daily living area of the user set at S404" from "the living area of the user estimated at S403". Thus, all of the non-daily-visiting places of the user are included in the non-daily living area and the daily-visiting places of the user are excluded from the non-daily living area.

At S406, the controller 31 records and stores the area information, which indicates the daily living area and the non-daily living area set in the above-described way, in the management table 4 of the user in the attribute information DB 34. In addition, via the communication device 32, the controller 31 transmits this area information to the in-vehicle navigation apparatus 20 that had transmitted the place information serving as the trigger for starting the present area information registration process. After S406, the present area information registration process is ended.

[4. Attribute Information Creation Process]

Figure 8:
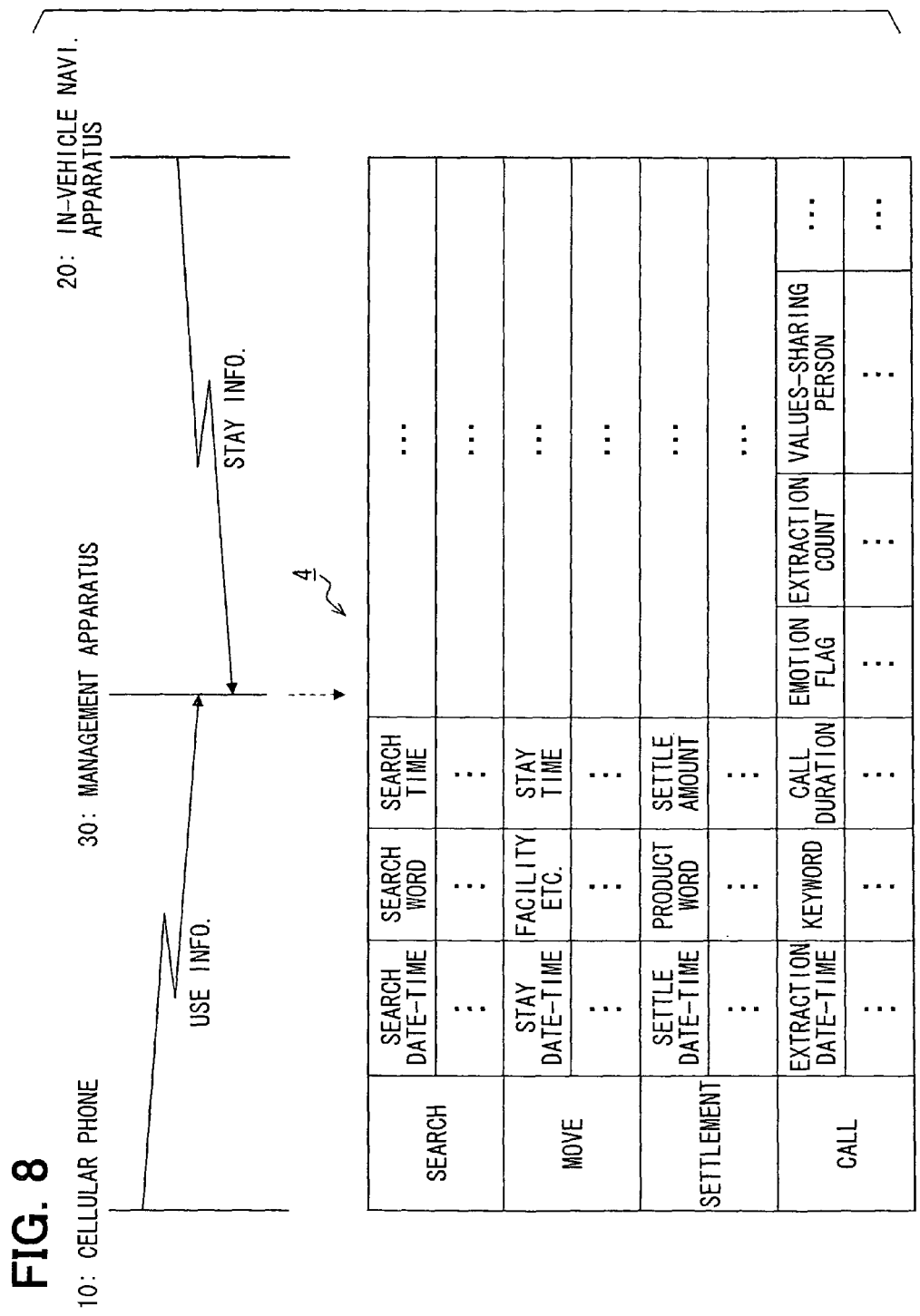
FIG. 8 is a flowchart illustrating an attribute information creation process performed by the controller of the management apparatus.

FIG. 8 is a diagram for explanation on the attribute information creation process performed by the controller 31 of the management apparatus 30. In the attribute information creation process, to begin with, various information (the user information, the stay information) transmitted from the in-vehicle navigation apparatus 20 or the cellular phone 10 is recorded and stored in the management table 4 corresponding to the user ID (or the vehicle ID) in the attribute information DB 34, as shown in FIG. 8.

For example, in response to receiving the user information including the search word from the cellular phone 10 via the communication device 32, the controller 31 records the date-time of search, the search word and the browsing time, which are contained in the user information, in a category "search" in the management table 4. Then, the controller 31 identifies an attribute group 3 (one of the attribute groups 3A to 3D) corresponding to the search word. In addition, depending on the browsing time of the website associated with this search word, the controller 31 sets a larger weighting factor for the identified attribute group 3 (one of the attribute groups 3A to 3D) of the attribute radar chart 5 (see FIG. 2B).

In another case, in response to receiving the stay information from the in-vehicle navigation apparatus 20 via the communication device 32, the controller 31 records the stay date-time, the name and place of the facility or event, and the staying time, which are contained in the stay information, in a category "movement" of the management table 4. Then, the controller 31 identifies an attribute group 3 (one of the attribute groups 3A to 3D) corresponding to the name of the facility and event. In addition, depending on the staying time, the controller 31 sets a larger weighting for the identified attribute group 3 (one of the attribute groups 3A to 3D) of the attribute radar chart 5 (see FIG. 2B).

In yet another case, in response to receiving the user information including the commercial product from the cellular phone 10 via the communication device 32, the controller 31 records the settlement date-time, the commercial product word and the payment amount, which are contained in the user information, are recorded in a category "settlement" in the management table 4. Then, the controller 31 identifies an attribute group 3 (one of the attribute groups 3A to 3D) corresponding to the commercial product word. In addition, depending on the payment amount, the controller 31 sets a larger weighting factor for the identified attribute group 3 (one of the attribute groups 3A to 3D) of the attribute radar chart 5 (see FIG. 2B).

In yet another case, in response to receiving the user information including the keyword from the cellular phone 10 via the communication device 32, the controller 31 records the date-time of extraction of the keyword, the keyword and the duration of telephone call, which are contained in the user information, in a category "telephone call" of the management table 4. Then, the controller 31 identifies an attribute group 3 (one of the attribute groups 3A to 3D) corresponding to the keyword. In addition, depending on the duration of telephone call, the controller 31 sets a larger weighting for the identified attribute group 3 (one of the attribute groups 3A to 3D) of the attribute radar chart 5 (see FIG. 2B). In particular, if the emotion flag is set to the user information, the controller 31 records and stores the keyword as a pleasant keyword, sets a larger weighting depending on the count of extraction of the pleasant keyword, and records and stores a user ID of the third party in the telephone call by regarding the third party as the values-sharing person.

In this way, the attribute radar chart 5, which shows a tendency of individual user's interests by weighting respective attribute groups 3A to 3D, is updated. A facility or event place actually visited by an individual user, a staying date-time, various keywords (including a search word, a commercial product word), a date-time of extraction, and a user ID corresponding to a values-sharing person are recorded.

[5. Facility-Event Information Transmission Process]

Figure 9:
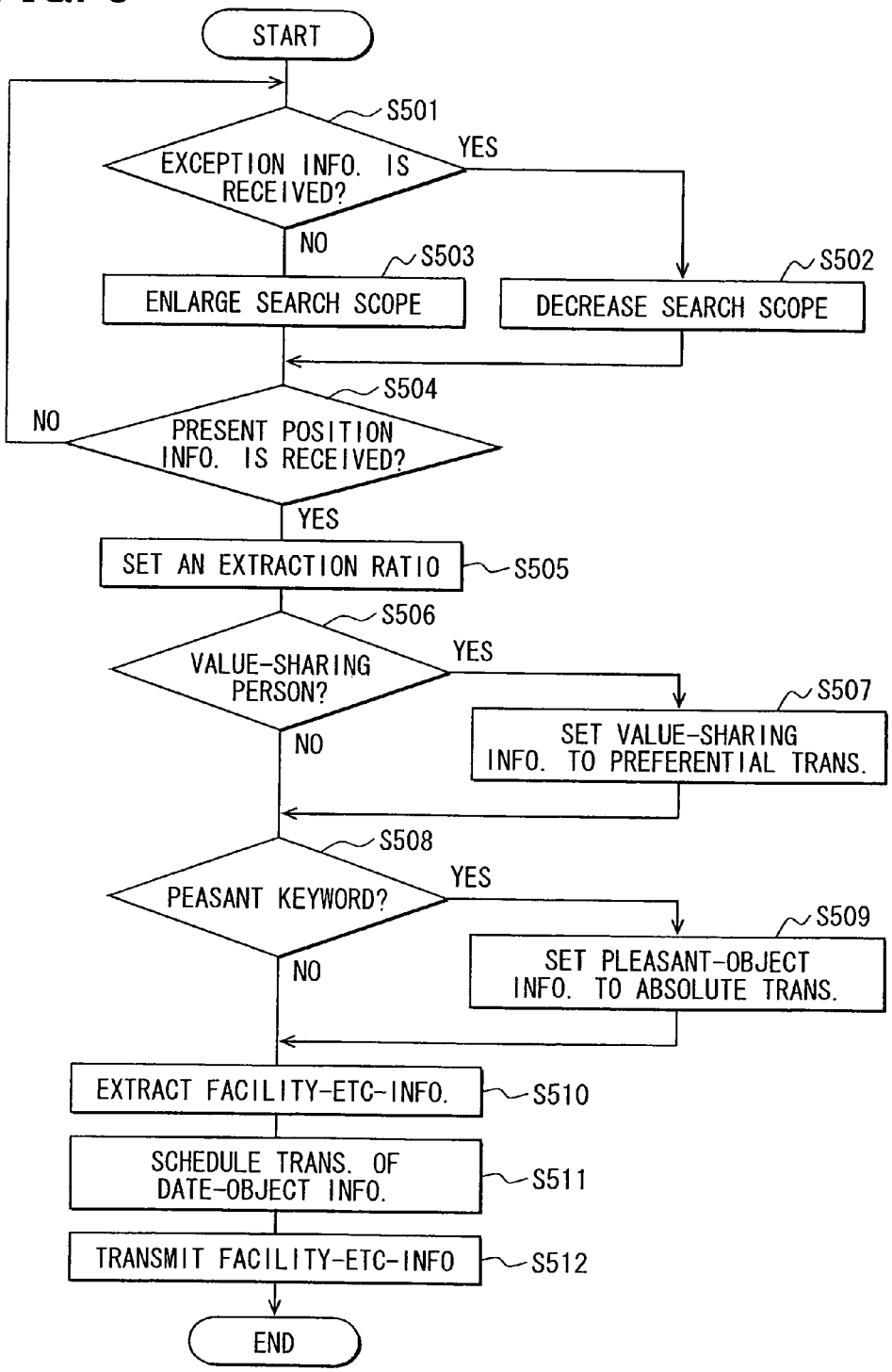
FIG. 9 is a flowchart illustrating a facility-event information transmission process performed by the controller of the management apparatus.

FIG. 9 is a flowchart illustrating a procedure of the facility-event information transmission process performed by the controller 31 of the management apparatus 30.

The controller 31 starts the facility-event information transmission process in response to receiving the present position information or the exception information from the in-vehicle navigation apparatus 20 via the communication device 32.

At S501, it is determine whether the received information is the exception information. When the controller 31 does not receive the exception information via the communication device 32, corresponding to "NO" at S501, the process proceeds to S502.

At S502, the search scope for extracting the facility-event information from the facility-event information DB 33 is decreased based on the vehicle ID added to the exception information. For example, based on the present position information (the present position information added to the same vehicle ID as the above-described exception information) received via the communication device 32, the search scope is set in the following way. When the present position of the vehicle is within the daily living area of the user corresponding to this vehicle ID, the search scope is set to the day-living area. When the present position of the vehicle is within the non-daily living area, the search scope is set to this non-daily living area. When it is determined at S502 that the controller 31 receives the exception information via the communication device 32, corresponding to "YES" at S501, the process proceeds to S503.

At S503, the search scope is set to the living area of the user covering the daily-living area and the non-daily living area, so that the search scope is enlarged.

At S504, it is determined whether the controller 31 receives the present position information via the communication device 32. When the present position information is not received (S504, NO), the process returns to S501. When the present position information is received (S504, YES), the process proceeds to S505.

At S505, for the attribute group 3 (one or ones of 3A to 3D), the controller 31 sets a ratio (extraction ratio) in extracting the facility-event information according to the weighting shown by the attribute radar chart 5 (see FIG. 2B) of the user based on the vehicle ID added to the present position information.

At S506, the controller 31 refers to the management table 4 in the attribute information DB 34 based on the user ID. If the values-sharing person, who is a person registered as sharing values with the user, exists, the controller 31 refers to in turn the facility-event information DB 33 based on the user ID of this value-sharing person, and determines whether the facility-event information provided from the values-sharing person, if exists, matches the above-mentioned search scope. When the above-mentioned facility-event information matching the search scope (S506, YES) exists, the process proceeds to S507.

At S507, the controller 31 configures a setting for extracting and transmitting this facility-event information (also called "values-sharing information"), such that this facility-event information is to be preferentially extracted and transmitted.

At S508, the controller 31 refers to the management table 4 in the attribute information DB 34 based on the user ID. If there is the pleasant keyword of this user, the controller 31 refers to the facility-event information DB 33, and determines whether there is the facility-event information classified as one of the attribute groups 3 (any of 3A to 3D) that corresponds to this pleasant keyword and matches the above-mentioned search scope. If this facility-event information exists (S508, YES), the process proceeds to S509.

At S509, the controller 31 configures a setting for extracting and transmitting this facility-event information such that that this facility-event information (also called herein "pleasant object information") is to be absolutely extracted and transmitted.

At S510, in accordance with the extraction ratio set at S505 and contents of the settings configured at S507 and S509, the controller 31 extracts the facility-event information matching the above-mentioned search scope from the facility-event information DB 33.

At S511, the controller 31 schedules the date-object information to be transmitted, if the facility-event information extracted at S510 includes the date-object information. In the above, the date-object information is such information that a time or season to provide the information to the user is of importance. For example, the controller 31 schedules the transmission of the facility-event information of a grocery shop in such a way that the time of transmission of the facility-event information is set to a park-hours of day of the grocery shop. Furthermore, the controller 31 schedules the transmission of (i) the facility-event information of a facility or event dealing with a seasonal food or (ii) the facility-event information of a seasonal sport such as skinning and the like in such a way that the time of the transmission is set to a corresponding season. The above date-object information is pre-stored in the facility-event information DB 33 so as to be distinguishable from other facility-event information. Times or seasons to provide particular information to users can be different from user to user. Thus, such times or seasons are previously recorded and stored in the management tables 4 for respective users in the attribute information DB 34, based on the place information from the in-vehicle navigation apparatus 20 or the user information (specifically, the date and time of keyword extraction) from the cellular phone 10.

S511, the controller 31 transmits all of the facility-event information extracted at S510 except the date-object information to the in-vehicle navigation apparatus 20 via the communication device 32. In addition, the controller 31 transmits a specific part, corresponding to the present date and hours (including the present time), of the date-object information scheduled at 5511 to the in-vehicle navigation apparatus 20 via the communication device 32. After S511, the facility-event information transmission process is ended.

[Exemplary Unpredictable Advantages]

As can be seen from the above, the information providing system 1 of the present invention is configured so that: the present position information is acquired by the position detection device 22 of the in-vehicle navigation apparatus 20; the stay place of the vehicle is set based on the present position information; the management apparatus 30 estimates a living area of the user from the multiple stay places; the search scope is set to an inside of the living area; and the facility-event information is extracted using the search scope and is transmitted to the in-vehicle navigation apparatus 20.

Therefore, according to the information providing system 1 of the present embodiment, it is possible to automatically provide the information matching a lifestyle of the user within traveling areas of the vehicle; therefore, it is possible to restrict unwanted information from being provided and it is possible to restrict wanted information from failing to be provided. Furthermore, it is possible to eliminate a cumbersome operation for a user. As a result, it is possible to provide a system that can rationally provide information useful to a user and can have high usability.

Furthermore, in the information providing system 1, the cellular phone owned by individual user is usable as a sensor at each facility or event place; thereby, information showing a real-time situation can be incorporated in the facility-event information and more useful information can be rationally provided.

Furthermore, in the information providing system 1, the management apparatus 30 measures level of each user's interests in respective genres (attribute groups 3A to 3D) by using the attribute radar chart, and transmits the facility-event information corresponding to the respective genres in balance (extraction ratios) suited for each user. Therefore, it is possible to provide useful information while covering user's preferences without bias.

Furthermore, in the information providing system 1, the attribute radar chart 5 weights respective genres according to the staying time at each facility or event place, the browsing time of the website associated with the search word, the settlement amount at purchase of the product associated with the commercial product word, the duration of telephone call when the various keywords were extracted, the count of keywords extracted during the telephone call with the values-sharing person, and the like. Therefore, it is possible to more appropriately reflect user's sense of values, as compared with a case where weights on genres are set merely according to reception count of such information.

Furthermore, in the information providing system 1, the management apparatus 30 refers to the management tables 4 of respective users in the attribute information DB 34, and schedules transmission of the date-object information so that the date-object information will be transmitted at the specific time or season determined based on the date and time of keyword extraction. Therefore, it is possible to provide the facility-event information (date-object information) at right time and at right season appropriate for each user.

Furthermore, the information providing system 1 automatically identifies the values-sharing person who shares values with the user. To this user, the management apparatus 30 preferentially transmits the facility-event information (values-sharing information) provided from the values-sharing person. Therefore, it is possible to rationally provide a lot of information matching his or her sense of values.

Other Embodiments

Embodiment is not limited to the above-described embodiment and can have various forms.

For example, in the area information registration process of the above embodiment, the collective area covering all of rational paths from one daily-visiting place of the user to another daily-visiting place of the user is set as the daily-living area. However, the daily-living area is not limited to the above example. For example, an area whose radius is between two daily-visiting places having the longest distance among combinations of the multiples daily-visiting places may be set as the daily living area.

In the information providing system 1 of the above embodiment, the management apparatus 30 performs the area information registration process and thereby sets the living-area of the user (daily living area, non-daily living area). Alternatively, for example, the in-vehicle navigation apparatus 20 may performs a process for setting the living-area of the user (daily living area, non-daily living area) and may transmit, in place of the place information, the area information indicating the living area to the management apparatus 30.

In the information providing system 1 of the above embodiment, the in-vehicle navigation apparatus 20 is mounted to the vehicle. Alternatively, a portable navigation apparatus or a portable apparatus may act as the above in-vehicle navigation apparatus 20. For example, the cellular phone 10 having a navigation function may act as the above in-vehicle navigation apparatus 20.

In the information providing system 1 of the above embodiment, the in-vehicle navigation apparatus 20 provides the facility-event information to a user through communicating with the management apparatus 30. Alternatively, the in-vehicle navigation apparatus 20 may include the facility-event information DB 33 or the management table 4 of the user, and may provide the facility-event information to the user without communicating with the management apparatus 30. Furthermore, the information providing apparatus is not limited to the in-vehicle navigation apparatus 20, and may be the portable apparatus or the cellular phone 10.

[Aspects]

The navigation system including the in-vehicle navigation apparatus 20 can correspond to an in-vehicle apparatus. The facility-event information DB 33 can correspond to an information storage means, unit or device. The position detection device 22 can correspond to a present position acquisition means, unit or device. The controller 31, which is configured to perform the area information registration process and the facility-event information transmission process (S501 to S504), can correspond to a search scope setting means, unit or device. The controller 31, which is configured to perform the facility-event information transmission process (S505 to S510), can correspond to an information extraction means, unit or device. The display device 25 can correspond to an information indicating means, unit or device, and an information displaying means, unit or device. The controller 21, which is configured to perform the information transmission process (S201 to S206), can correspond to a stay place setting means, unit or device. The storage 24 can correspond to a received information storage (received information storage means, unit or device). The controller 21, which is configured to perform the information providing process (S301 to S304), can correspond to a user condition estimation means, unit or device. The controller 21, which is configured to perform the information providing process (S305 to S306), can correspond to a hierarchical information extraction means, unit or device. The pressing down amount sensor and the steering wheel operation amount sensor, which are ones of detection sensors connected to the in-vehicle navigation apparatus 20, can correspond to an operation amount detection means, unit or device. The physiological sensor and the image sensor can correspond to an activation degree detection means, unit or device. The image sensor and the interface 27 (and the cellular phone 10) can correspond to a pleasant degree estimation means, unit or device.

According to a first example of embodiment, an information providing apparatus for providing facility-event information, which is information of facilities or events, includes an information storage, a present position acquisition unit, a search scope setting unit, an information extraction unit, an information indicating unit, and a stay place setting unit. The information storage stores the facility-event information of facilities or events while associating the facility-event information of the facilities or events with respective location data of the facilities or events. The present position acquisition unit acquires present position information indicating present position of the information providing apparatus. The search scope setting unit sets a search scope parameterized by the location data, based on the present position information acquired by the present position acquisition unit. The information extraction unit extracts, from the information storage, the facility-event information that matches the search scope set by the search scope setting unit. The information indicating unit provides at least some of the facility-event information extracted by the information extraction unit, to a user of the information providing apparatus. The stay place setting unit measures, based on the present position information acquired by the present position acquisition unit, a movement stop time defined as a period of time from when movement of the information providing apparatus stops to when the movement of the information providing apparatus restarts. The stay place setting unit sets each place, at which the measured movement stop time exceeds a prescribed staying time, as a stay place. The search scope setting unit estimates that a living area of the user is a collective area covering all of the stay places of the user based on the location data corresponding to the stay places set by the stay place setting unit. The search scope setting unit sets the collective area as the search scope.

According to the above information providing apparatus, it is possible to extract the facility-event information that matches a style-based search scope representing a living area of the user, unlike a conventional case where a mere-distance-based search scope is used. Therefore, the information matching the user's lifestyle will be provided. For this reason, it is possible to restrict unwanted information (noise) from being provided to the user and it is possible to surely provide useful information to the user even when the user information is information about a facility or event in "area located X km distant or more from the present position". Furthermore, since the living are of the use is automatically estimated from the multiple stay places where the user stays, it is unnecessary for a user to perform a manual input and it is possible to eliminate a cumbersome setting operation for the user.

Therefore, the above information providing apparatus can provide information useful to a user in a rational manner. The above information providing apparatus can have high usability.

According to a second example of embodiment, an information providing system may be configured as follows.

The information providing system includes: a management apparatus that includes a database, the database storing the facility-event information of facilities or events while associating the facility-event information of the facilities or events with respective location data of the facilities or events; and a portable apparatus that communicates with the management apparatus. The portable apparatus acquires present position information indicating the present position of the portable apparatus, transmits portable-source information, which is based on the present position information, to the management apparatus, and provides, to a user of the portable apparatus, at least some of the facility-event information transmitted from the management apparatus. The management apparatus sets, based on the portable-source information transmitted from the portable apparatus, a search scope parameterized by the location data. The management apparatus extracts the facility-event information matching the search scope from the database, and transmits the extracted facility-event information to the portable apparatus. The portable apparatus measures, based on the present position information, a movement stop time defined as a period of time from when movement of the portable apparatus stops to when the movement of the portable apparatus restarts. The portable apparatus sets each place, at which the movement stop time exceeds a prescribed staying time, as a stay place, and transmits place information indicating each stay place to the management apparatus. The management apparatus estimates, based on the location data corresponding to respective stay places transmitted from the portable apparatus, that a living area of the user is a collective area covering all of the stay places of the user. The management apparatus sets the collective area as the search scope.

According to the above information providing system, for the substantially same reason described in the above first example, it is possible to restrict unwanted information (noise) from being provided to the user and it is possible to surely provide useful information to the user even when the user information is information about a facility or event "in an area located X km distant or more from the present position". Furthermore, t is possible to eliminate a cumbersome setting operation for the user.

Therefore, the above information providing apparatus can provide information useful to a user in a rational manner. The above information providing apparatus can have high usability.

According to a third example of embodiment, an information providing system may be configured so that the information providing system of the third example is different from the information providing system of the second example in the following points.

Specifically, the information providing system of the third example includes, in place of the portable apparatus, an in-vehicle apparatus mounted to a vehicle and configured to be capable of communicating with the management apparatus. Because of this, the present position information indicates present position of the vehicle.

Furthermore, the in-vehicle apparatus measures a parking time of the vehicle, sets each place, at which the parking time exceeds a prescribed staying time, as a stay place based on the present position information, and transmits place information indicating each stay place to the management apparatus. The management apparatus estimates that a living area of the user is a collective area covering all of the stay places of the user, based on respective location data corresponding to the stay places transmitted from the in-vehicle apparatus, and sets the collective area as the search scope.

According to the above information providing system, for the substantially same reason described in the above first and second examples, it is possible to provide information useful to a user in a rational manner. The above information providing apparatus can have high usability.

There may be various manners of estimating the living area of the user.

For example, the living area may be estimated as the collective area that covers all rational paths from one of the stay places to another one of the stay places.

In the above configuration, the facility-event information of a facility or event nearby a place where the vehicle is expected to certainly pass through can be provided to the user. If there is the facility-event information that the user likes, the user can relatively easily drop on the facility or event place indicated by the facility-event information. It should be noted that the rational path may be for example a path computed by a minimum cost calculation using Dijkstra method, or may be an actually frequently-used path.

Alternatively, the living area may be estimated as an area whose diameter is between specific two of the stay places, the specific two having therebetween largest distance among combinations of the stay places. In this case, it is possible to straightforwardly obtain the area from only the multiple already-set stay places, without taking into account the above route calculation or use frequency. Thus, a process of setting the living area can be made as an easy or simple process. Therefore, it is possible to reduce load on the apparatus.

The living area may be divided into a daily living area and a non-daily living area. For example, the information providing system may be configured as follows. The in-vehicle apparatus sets each place, which is one stay place where the vehicle is periodically parked, as a daily-visiting place based on an acquisition date and time of the present position information, and transmits daily-visiting place information indicating each daily-visiting place to the management apparatus. The management apparatus estimates, from respective location date of the daily-visiting places, that a daily-living area of the user is a collective area that covers all of the daily-visiting places of the user and a non-daily-living area is the living area except the daily-living area. The management apparatus acquires the present position information from the in-vehicle apparatus, and sets the search scope based on the present position information by setting the daily-living area as the search scope when the present position of the vehicle is within the daily-living area of the user, and setting the non-daily-living area as the search scope when the present position of the vehicle is within the non-daily-living area of the user.

According to the above configuration, by taking the present position of the user into consideration, the system provides the information that well matches a life style. Therefore, it is possible to more efficiently restrict unwanted information (noise) from being provided to the user and it is possible to more surely provide useful information to the user.

In some cases, it is possible provide highly-useful information to the user if the search scope is switched in the daily living area and the non-daily living area not only straightforwardly based on the present position of the vehicle but also further based on exception conditions. For example, the information providing system may be configured as follows. The in-vehicle apparatus creates exception information if a prescribed exception condition is satisfied, and transmits the vehicle source information including the exception information to the management apparatus. When the exception information is contained in the vehicle source information transmitted form the in-vehicle apparatus, the management apparatus incorporates the non-daily-living area of the user in the search scope even if the present position of the vehicle is within the daily-living area of the vehicle.

More specifically, the in-vehicle apparatus may calculate a travel route of the vehicle from a departure point to a destination point, and the in-vehicle apparatus may create the exception information if the destination point of the travel route, where the vehicle is traveling, is a home of the user.

According to the above configuration, it is possible to provide non-daily information to the user when the user is going back to home from a work place for example. Therefore, it is possible to advantageously relax his or her excessive stress of the user. Alternatively, the information providing system may be configured as follows. The in-vehicle apparatus creates the exception information if the destination point of the travel route, where the vehicle is traveling, is within the non-daily-living area of the user.

According to the above configuration, it is possible to provide non-daily information to the user in an early stage when the user is going for an outing for example. It is possible to provide much more useful information taking the destination point into consideration.

Alternatively, the information providing system may be configured as follows. The in-vehicle apparatus creates the exception information if the acquisition date and time of the present position information shows a holiday (e.g., Saturday, Sunday, public holiday, summer vacation season, around new-year day) or a day before the holiday.

According to the above configuration, it is possible to provide non-daily information to the user when the user is driving the vehicle on Friday within the living area of the user. This may generate an outing motivation of the user, such as trip motivation and the like, and may make it easier for the user to make his or her weekend plan.

The above information providing system may be configured to include a cellular phone that is carried by the user of the in-vehicle apparatus so as to be communicatable with the in-vehicle apparatus.

More specifically, the cellular phone transmits function history information to the in-vehicle apparatus. The function history information indicates a time and date of usage of an additional function of the cellular phone and a time period of the usage of the additional function of the cellular phone. The additional function comprises all of functions of the cellular phone except a telephone call function, a mail function, a browser function and one or more prescribed application functions. The in-vehicle apparatus creates the exception information if: the in-vehicle apparatus receives the function history information from the cellular phone; and the received function history information indicates that the time period of the usage of the additional function within a given period of time prior to boarding the vehicle is longer than a preset threshold time period.

It is conceivable that a long time period of the usage of the additional function of the cellular phone suggests that the user has a relatively-degree of mental leeway. Thus, in the above case, if a relatively large amount of information is provided to the user, this is not an excessive load of the user. As can be seen, according to the above configuration, it is possible to provide information in line with a degree of the mental leeway of the user.

As described above, since it is important to provide information to the user in consideration of the load of the user, the information providing system may be configured in the following way for example. The facility-event information of each facility or event comprises multiple hierarchized information elements different in information amount from each other. The in-vehicle apparatus includes a reception information storage, a user condition estimation unit, a hierarchized information extraction unit, and an information display unit. The reception information storage stores therein the facility-event information in response to receiving the facility-event information from the management apparatus. The user condition estimation unit estimates a load condition of the user at a time when the user is driving the vehicle. The hierarchized information extraction unit extracts, from the reception information storage, one or ones of the hierarchized information elements whose information amount matches the load condition estimated by the user condition estimation unit. The information display unit displays at least one of the hierarchized information elements, the at least one being included in the one or ones of the hierarchized information elements extracted by the hierarchized information extraction unit.

According to the above configuration, when the load of the user driving the vehicle is small, a relative large amount of information is provided to the user. In contrast, when the load of the user driving the vehicle is large, a relative small amount of information is provided to the user. In this way, it is possible to provide information to the user in consideration of the load of the user.

For example, the hierarchized information elements included in the facility-event information may be label information, headline information and detail information, respectively. The information amount of the label information is relatively smaller than that of the headline information and the detail information. The information amount of the headline information is larger than that of the label information. The information amount of the detail information is larger than that of the headline information. The in-vehicle apparatus further includes an operation amount detection unit that detects an amount of operation that the user performs in relation to driving the vehicle. The user condition estimation unit estimates the load condition of the user based on the amount of operation detected by the operation amount detection unit. The hierarchized information extraction unit extracts the label information when the detected amount of operation is greater than a preset threshold amount. The hierarchized information extraction unit extracts the headline information when the detected amount of operation is not greater than the preset threshold amount.

According to the above configuration, it is possible to switch display of information depending on the load of the actual user's driving operation. For example, when the load of the user is large, the label information is displayed. When the load of the user is small, the headline information is displayed. Therefore, an amount of informant to be provided user can reliably reflect the load of the user.

Alternatively, the in-vehicle information providing system may be configured as follows. The in-vehicle apparatus includes an activation degree detection unit that detects an activation degree indicating activeness of sympathetic nervous of the user. The user condition estimation unit estimates the load condition of the user based on the activation degree detected by the activation degree detection unit. The hierarchized information extraction unit extracts the label information when the detected activation degree is less than a first preset threshold degree. The hierarchized information extraction unit extracts the headline information when the detected activation degree is greater than or equal to the first preset threshold degree.

According the above configuration, it is possible to switch display of information depending on neuroscience-related load (brain-science-related load) on the user, which may not be measured from an aspect of the actual driving operation. For example, when the load of the user is large, the label information is displayed. When the load of the user is small, the headline information is displayed. Therefore, it is possible to provide information to the user in a fine arrangement manner by taking into account a user's brain activity state.

Specifically, the activation degree may be a degree of increase in biological value of the user from a preset reference value of the user. The biological value of the user includes at least one of blink rate of the user, breathing rate of the user, heart rate of the user, and electrocardiographic value of the user.

That is, since the above degree of increase is based on an action and a reaction depending on the sympathetic nerve and the parasympathetic nerve, the above degree of increase can be detected relatively easily. Moreover, the above degree of increase can be used as an indicator (barometer) indicating that the sympathetic nerve is working in predominance more than the parasympathetic nerve.

Alternatively, the in-vehicle information providing system may be configured as follows. The in-vehicle apparatus includes a pleasant degree estimation unit that estimates a pleasant degree of the user indicating a part of emotion of the user. The user condition estimation unit estimates the load condition of the user based on the pleasant degree estimated by the pleasant degree estimation unit. The hierarchized information extraction unit extracts the label information when the pleasant degree is less than a second preset threshold degree. The hierarchized information extraction unit extracts the headline information when the pleasant degree is greater than or equal to the second preset threshold degree. More specifically, the pleasant degree estimation unit may set the pleasant degree higher than the second preset threshold degree when then pleasant degree estimation unit recognizes at least one of the followings: direction of eyes of the user points to the information display unit more than a predetermined time period; pupil of the user is enlarged; and speech uttered by the user shows a preset waveform pattern.

According to the above configuration, it is possible to switch display of information depending on the mental load of the user, which may not be measured from an aspect of the actual driving operation. For example, when the mental load of the user is large, the label information is displayed. When the mental load of the user is small, the headline information is displayed. Therefore, it is possible to provide information to the user in a fine arrangement manner by taking into account a user's mental state. Emotion of the user can be estimated based on an action or reaction caused by his or her brain. In particular, from the direction of eyes or the pupil, it is possible to estimate whether the user is having an interest. From the uttered speech, it is possible to estimate whether the user is having a positive impression. When the user is having the interest or positive impression, a pleasant degree is high. That is, since a change in direction of eyes, pupil or uttered speech can be relatively easily recognized, the pleasant degree can be advantageously estimated using such changes.

As for the in-vehicle apparatus, the information display unit may display the label information or the headline information in such manner that the label information or the headline information is switchable into the detail information. According to this configuration, it is possible to display the facility-event information so as to increase the information amount of the facility-event information that the user is having the interest in, in response to, for example, user's input manipulation.

As for the facility-event information, improvement of convenience is achievable if the facility-even information of the facilities or events is stored in the database while being classified in multiple prescribed attribute groups. In view of this, the above information providing system may be configured as follows. The in-vehicle apparatus transmits stay information to the management apparatus. The stay information indicates a vehicle-parked facility or event where the vehicle is parked. The management apparatus extracts a specific piece of the facility-event information, which specific piece is classified as one of the prescribed attribute groups that has an attribute in common with the vehicle-parked facility or event indicated by the stay information, from the database based on the stay information received from the in-vehicle apparatus.

According to the above configuration, it is possible to provide a variety of information relating to things by which the user is intrigued so as to actually go there. As a result, it is possible to provide information to the user by pinpointing the information that is most likely used by the user.

As the prescribed attribute groups, the facility-event information of the facilities or events is classified in: a physical use group mainly associated with physical use; a mental use group mainly associated with mental use; a physical rest group mainly associated with physical rest; and a mental rest group mainly associated with mental rest. For example, the physical use group may include information associated with various sports. The physical rest group may include information associated with meal or hot spring. The mental rest group may include information associated with music listening.

When the variety of information is provided to the user, the system may provide the information to the user while weighting respective attribute groups in a manner as to reflect interest levels of the user. Alternatively, the system may provide the information to the user while changing information providing priorities. For example, the information providing system may be configured as follows. The in-vehicle apparatus transmits the vehicle source information so that any of the vehicle source information includes a vehicle ID for identification of the vehicle. The stay information includes staying time information, which indicates a staying time of the user at the vehicle-parked facility or event where the vehicle is parked. In response to receiving the stay information from the in-vehicle apparatus, the management apparatus (i) records the stay information in a management table that is preset for each vehicle ID, (ii) sets a weighting factor of each attribute group according to the staying time indicated in the staying time information stored in the management table, and (iii) determines an extraction ratio of the facility-event information from the database according to the weighting factor.

According to the above configuration, it is possible to provide information to the user while reflecting the interest level of the user, which cannot be measured from only the user stay count. As a result, it is possible to provide information to the user in a well-balanced manner while appropriately reading a balance of levels of user's potential interests in respective attribute groups.

The above information providing system may be configured to further include a cellular phone that is carried by the user and is communicatable with the management apparatus. The system may use the cellular phone to take objects in which the user has interests. Specifically, the cellular phone extracts a keyword from a speech in a telephone call and a search word inputted in the cellular phone from the user, and transmits user information to the management apparatus. The transmitted user information is based on the extracted keyword and includes a user ID for identification of the user. In response to receiving the user information from the cellular phone, the management apparatus (i) records the user information in the management table corresponding to the vehicle ID pre-registered in association with the user ID, and (ii) extracts, from the database, the facility-event information that is classified as one of the attribute groups, the one having an attribute in common with the keyword.

According to the above configuration, it is possible to relatively easily identify user's interests. Thereby, it is possible to provide the information to the user while weighting respective attribute groups in a manner as to reflect interest levels of the user, and it is possible to provide the information to the user while changing information providing priorities.

More specifically, the cellular phone may set the keyword as a pleasant keyword when the keyword extracted from the speech in the telephone shows a preset waveform pattern indicating a high pleasant degree. The cellular phone may transmit the user information including the pleasant keyword to the management apparatus. To the in-vehicle apparatus, the management apparatus may preferentially transmit the facility-event information that is classified as the one of the attribute groups, the one having the attribute in common with the pleasant keyword.

According to the above configuration, it is possible to identify user's interests with high accuracy. Since it is possible to preferentially provide the information associated with the user's interest identified with high accuracy, it is possible to pinpoint the information that is to be provided to the user.

Alternatively, the information providing system may be configured as follows. The cellular phone sets the keyword as a pleasant keyword when the keyword extracted from the speech in the telephone call speech shows a preset waveform pattern indicating a high pleasant degree. The cellular phone transmits the user information including the pleasant keyword to the management apparatus. The management apparatus sets the weighting factor of each attribute group according a count of pleasant keywords in the management table.

According to the above configuration, it is possible to estimate a balance of levels of user's potential interests in respective attribute groups with high accuracy. Thereby, it is possible to more appropriately provide a variety of information to the user in a well-balance manner in line with user's preferences.

In order to provide information better matching user's preferences, the above information providing system may be configured to use the cellular phone in, for example, the following way. The facility-event information includes phone-source information, which is provided from the cellular phone. The database stores each user ID of a provider of the facility-event information while associating the each user ID with the facility-event information provided by the provider having the each user ID. Other party in the telephone call at extraction of the pleasant keyword is set as a values-sharing person by the cellular phone. The cellular phone transmits the user information including information for identification of the values-sharing person to the management apparatus. Based on the user information received from the cellular phone, the management apparatus extracts, from the database, the facility-event information suited for the values-sharing person if the values-sharing person is stored in the database as the provider of the facility-event information. To the in-vehicle apparatus, the management apparatus preferentially transmits the extracted facility-event information, which is suited for the values-sharing person.

In many cases, information supposed to match user's preferences overlaps a facility or event that the values-sharing person likes. Thus, information from the values-sharing person can be much more reliable than information given anonymously from someone whose age or environment is unknown. Therefore, preferences and review (rating) of the values-sharing person, who shares values with the user, are put ahead. In line with the preferences and review (rating) of the values-sharing person, information much more useful to the user can be preferentially provided to the user.

The above information providing system may be configured as follows. To the management apparatus, the cellular phone transmits the user information including an amount of payment for a commercial product when the commercial product is associated with the keyword and when the cellular phone is used to settle the payment for the commercial product. The management apparatus sets the weighting factor of each attribute group according the amount of payment.

According to the above configuration also, it is possible to estimate a balances of the interest levels with high accuracy. Thereby, it is possible to provide a variety of information in a more-appropriately-balanced manner in line with the user's preferences.

It may be preferable that the management apparatus transmits the facility-event information to the in-vehicle apparatus at a predetermined time which takes into account season and hours of day. For example, to the management apparatus, the cellular phone may transmit the user information including a date and hours when the keyword was extracted. The management apparatus may record the date and hours when the keyword was extracted in the management table in conjunction with the keyword. The management apparatus may transmit a specific piece of the facility information, which specific piece is classified as one of the attribute groups that has the attribute in common with the keyword, to the in-vehicle apparatus at a specific season that bases the date and hours when the keyword was extracted.

According to the above configuration, it is possible to previously record and store user's interests that can vary from season to season. Therefore, at the same season of every year, it is possible to provide the suitable information to the user at an early stage.

Alternatively, the above information providing system may be configured as follows. The cellular phone transmits the user information including a time of day of extraction of the keyword to the management apparatus. The management apparatus transmits a specific piece of the facility information, which specific piece is classified as one of the attribute groups that has the attribute in common with the keyword, to the in-vehicle apparatus at a specific time of day that corresponds to the time of day when the keyword was extracted.

According to the above configuration, it is possible to previously record and store user's interests that can vary from season to season. Therefore, at the same season of every year, it is possible to provide the suitable information to the user at an early stage.

In the above examples of the information providing system, the management apparatus plays a role of estimating a living area of the user. Attentively, the information providing system may be configured so that the portable apparatus or the in-vehicle apparatus play a role of estimating a living area of the user in place of the management apparatus.

For example, an information providing system may be configured as follows. The information providing system includes a management apparatus that has a database that stores the facility-event information of facilities or events while associating the facility-event information of the facilities or events with respective location data of the facilities or events. The information providing system further includes a portable device that is communicatable with the management apparatus. The portable apparatus acquires present position information indicating present position of the portable apparatus, transmits position-based information, which is based on the present position information, to the management apparatus, and provides, to a user of the portable apparatus, at least some of the facility-event information transmitted from the management apparatus. The management apparatus sets, based on the position-based information transmitted from the portable apparatus, a search scope parameterized by the location data, extracts the facility-event information that matches the search scope from the database, and transmits the extracted facility-event information to the portable apparatus. The portable apparatus measures, based on the present position information, a movement stop time defined as a period of time from when movement of the portable apparatus stops to when the movement of the portable apparatus restarts, and sets each place, at which the movement stop time exceeds a prescribed staying time, as a stay place. The portable apparatus estimates that a living area of the user is a collective area covering all of the stay places of the user, from respective location date corresponding to the stay places. The portable apparatus transmits area information, which indicates the estimated living area, to the management apparatus. The management apparatus sets the living area of the user as the search scope based on the area information received from the portable apparatus.

Alternatively, an information providing system may be configured as follows. The information providing system includes a management apparatus that has a database that stores the facility-event information of facilities or events while associating the facility-event information of the facilities or events with respective location data of the facilities or events. The information providing system further includes an in-vehicle apparatus that is mounted to a vehicle and is communicatable with the management apparatus. The in-vehicle apparatus acquires present position information indicating present position of the vehicle, transmits vehicle source information, which is based on the present position information, to the management apparatus, and provides, to a user driving the vehicle, at least some of the facility-event information transmitted from the management apparatus. The management apparatus sets, based on the vehicle source information transmitted from the in-vehicle apparatus, a search scope parameterized by the location data, extracts the facility-event information that matches the search scope from the database, and transmits the extracted facility-event information to the in-vehicle apparatus. The in-vehicle apparatus measures a parking time of the vehicle. The in-vehicle apparatus sets each place, at which the parking time of the vehicle exceeds a prescribed staying time, a stay place based on the present position information The in-vehicle apparatus estimates that a living area of the user is a collective area covering all of the stay places of the user, from respective location date corresponding to the stay places. The in-vehicle apparatus transmits area information indicating the living area of the user. The management apparatus sets the living area of the user as the search scope based on the area information received from the in-vehicle apparatus.

According to the above configurations, it is unnecessary for the management apparatus to estimate all of the living areas of individual users. Therefore, it is possible to remarkably reduce a load of the management apparatus.

While the invention has been described above with reference to various embodiments thereof, it is to be understood that the invention is not limited to the above described embodiments and constructions. The invention is intended to cover various modifications and equivalent arrangements.

What is claimed is:

1. An information providing system for providing information about a facility or an event as facility-event information, the information providing system comprising:
a management apparatus that includes a database, wherein the database stores facility-event information for a plurality of facilities or a plurality of events by associating the facility-event information for the facilities or the events with respective location data of the facilities or the events; and
an in-vehicle apparatus that is mounted to a vehicle and communicable with the management apparatus,
wherein:
the in-vehicle apparatus
acquires present position information indicating present position of the vehicle,
transmits vehicle source information, which is based on the present position information, to the management apparatus, and
provides a user, who drives the vehicle, with at least a piece of the facility-event information transmitted from the management apparatus;
the management apparatus
sets, based on the vehicle source information transmitted from the in-vehicle apparatus, a search scope parameterized by the location data,
extracts the facility-event information matching the search scope from the database, and
transmits the extracted facility-event information to the in-vehicle apparatus;

the in-vehicle apparatus
measures a parking time of the vehicle,
   sets a stay place of the user based on the present position information and the parking time of the vehicle, wherein the stay place is a place at which the parking time exceeds a threshold,
   sets a daily-visiting place of the user based on an acquisition date and time of the present position information, wherein the daily-visiting place is the stay place at which the vehicle is periodically parked,
   transmits place information indicating the stay place or the daily-visiting place to the management apparatus;
based on respective location data corresponding to the place information transmitted from the in-vehicle apparatus, the management apparatus
   estimates that a living area of the user is a collective area covering all of the stay places of the user,
   estimates that a daily-living area of the user is a collective area covering all of the daily-visiting places of the user,
   estimates that a non-daily-living area is the living area of the user except the daily-living area; and
the management apparatus
   acquires the present position information from the in-vehicle apparatus, and
   sets the search scope based on the present position information, by
      setting the daily-living area as the search scope when the present position of the vehicle is within the daily-living area of the user, and
      setting the non-daily-living area as the search scope when the present position of the vehicle is within the non-daily-living area of the user.

2. The information providing system according to claim 1, wherein:
the living area is a collective area that covers all rational paths from one stay place to another stay place.

3. The information providing system according to claim 1, wherein:
the living area is an area whose diameter is between specific two of the stay places of the user, the specific two having therebetween a largest distance among combinations of the stay places.

4. The information providing system according to claim 1, wherein:
the in-vehicle apparatus
   creates exception information when an exception condition is satisfied, and
   transmits the vehicle source information including the exception information to the management apparatus; and
when the exception information is included in the vehicle source information transmitted form the in-vehicle apparatus, the management apparatus incorporates the non-daily-living area of the user in the search scope even when the present position of the vehicle is within the daily-living area of the vehicle.

5. The information providing system according to claim 4, wherein:
the in-vehicle apparatus calculates a travel route of the vehicle from a departure point to a destination point; and
the in-vehicle apparatus creates the exception information when the vehicle is traveling on the travel route whose destination point is a home of the user.

6. The information providing system according to claim 5, wherein:
the in-vehicle apparatus creates the exception information when the vehicle is traveling on the travel route whose destination point is located within the non-daily-living area.

7. The information providing system according to claim 4, wherein:
the in-vehicle apparatus creates the exception information when the acquisition date and time of the present position information shows that today is a holiday or a day before the holiday.

8. The information providing system according to claim 4, further comprising:
a cellular phone that is carried by the user of the in-vehicle apparatus and is communicable with the in-vehicle apparatus,
wherein:
the cellular phone transmits function history information to the in-vehicle apparatus;
the function history information indicates a time and date of usage of an additional function of the cellular phone and a time period of the usage of the additional function of the cellular phone;
the additional function comprises all of functions of the cellular phone except a telephone call function, a mail function, a browser function and one or more other application functions; and
the in-vehicle apparatus creates the exception information when:
   the in-vehicle apparatus receives the function history information from the cellular phone; and
   the received function history information indicates that the time period of the usage of the additional function within a given period of time prior to boarding the vehicle is longer than a threshold time period.

9. The information providing system according to claim 1, wherein
the facility-event information for each facility or each event comprises a plurality of hierarchized information elements different in information amount from each other, the information amount being an amount of data; and
the in-vehicle apparatus includes:
   a reception information storage that records therein the facility-event information upon receipt of the facility-event information from the management apparatus;
   a user condition estimation unit that estimates a load on the user who is driving the vehicle;
   a hierarchized information extraction unit that extracts, from the reception information storage, the hierarchized information elements whose information amounts match the load condition estimated by the user condition estimation unit; and
   an information display unit that displays at least one of the hierarchized information elements extracted by the hierarchized information extraction unit.

10. The information providing system according to claim 9, wherein:
the facility-event information for each facility or each event includes label information, headline information and detail information as the hierarchized information elements;
the information amount of the label information is smaller than that of the headline information and that of the detail information;

the information amount of the detail information is larger than that of the headline information;

the in-vehicle apparatus further includes
an operation amount detection unit that detects an amount of operation of the user driving the vehicle;

the user condition estimation unit estimates the load on the user based on the amount of operation detected by the operation amount detection unit;

the hierarchized information extraction unit extracts the label information when the detected amount of operation of the user driving the vehicle is greater than a threshold; and the hierarchized information extraction unit extracts the headline information when the detected amount of operation of the user driving the vehicle is not greater than the threshold.

11. The information providing system according to claim 9, wherein:

the facility-event information for each facility or each event includes label information, headline information and detail information as the hierarchized information elements;

the information amount of the label information is smaller than that of the headline information and that of the detail information;

the information amount of the detail information is larger than that of the headline information;

the in-vehicle apparatus includes
an activation degree detection unit that detects an activation degree indicating activeness of sympathetic nervous of the user;

the user condition estimation unit estimates the load on the user based on the activation degree detected by the activation degree detection unit;

the hierarchized information extraction unit extracts the label information when the detected activation degree is less than a first threshold degree; and the hierarchized information extraction unit extracts the headline information when the detected activation degree is greater than or equal to the first threshold degree.

12. The information providing system according to claim 11, wherein:

the activation degree is a degree of increase in biological value of the user with respect to a reference value of the user; and the biological value of the user includes at least one of blink rate of the user, breathing rate of the user, heart rate of the user, and electrocardiographic value of the user.

13. The information providing system according to claim 9, wherein:

the facility-event information for each facility or each event includes label information, headline information and detail information as the hierarchized information elements;

the information amount of the label information is smaller than that of the headline information and that of the detail information;

the in-vehicle apparatus includes
a pleasant degree estimation unit that estimates a pleasant degree of the user, the pleasant degree representing a part of emotion of the user;

the user condition estimation unit estimates the load on the user based on the pleasant degree estimated by the pleasant degree estimation unit;

the hierarchized information extraction unit extracts the label information when the pleasant degree is less than a second threshold degree;

the hierarchized information extraction unit extracts the headline information when the pleasant degree is greater than or equal to the second threshold degree; and the pleasant degree estimation unit increases the pleasant degree when recognizing at least one of the followings:
a line of sight of the user points to the information display unit for a predetermined time period or more;
pupil of the user is enlarged; and
speech uttered by the user shows a specific waveform pattern.

14. The information providing system according to claim 10, wherein:

the information display unit displays the label information or the headline information in such manner that the label information or the headline information is switchable into the detail information.

15. The information providing system according to claim 1, wherein:

the facility-event information are stored in the database while being classified in a plurality of attribute groups;

the in-vehicle apparatus transmits stay information to the management apparatus, the stay information indicating the facility or the event where the vehicle is parked; and based on the stay information received from the in-vehicle apparatus, the management apparatus extracts from the database the facility-event information that is classified in one of the attribute groups that has an attribute in common with the facility or the event indicated by the stay information.

16. The information providing system according to claim 15, wherein:

the facility-event information for the facilities or the events is classified in: a physical use group associated with physical use; a mental use group associated with mental use; a physical rest group associated with physical rest; and a mental rest group associated with mental rest.

17. The information providing system according to claim 15, wherein:

any vehicle source information transmitted from the in-vehicle apparatus includes a vehicle ID for identification of the vehicle;

the stay information includes staying-time information, which indicates a staying time of the user at the facility or the event where the vehicle is parked; and upon receipt of the stay information from the in-vehicle apparatus, the management apparatus
records the stay information in a management table, which is preset on a vehicle ID basis,
sets a weighting factor of each attribute group according to the staying time indicated in the staying time information stored in the management table, and
determines an extraction ratio of the facility-event information from the database according to the weighting factor.

18. The information providing system according to claim 17, further comprising:

a cellular phone that is carried by the user and is communicable with the management apparatus, wherein:
the cellular phone
extracts a keyword from a speech in a telephone call and a search word inputted to the cellular phone from the user, and transmits user information to the management apparatus based on the extracted keyword;

the transmitted user information includes an user ID for identification of the user; and upon receipt of the user information from the cellular phone, the management apparatus records the user information in the management table corresponding to the vehicle ID pre-registered in association with the user ID, and extracts, from the database, the facility-event information that is classified in one of the attribute groups, the one having an attribute in common with the keyword.

19. The information providing system according to claim 18, wherein:

the cellular phone regards the keyword as a pleasant keyword when the speech in the telephone call in extraction of the keyword shows a waveform pattern indicating that a pleasant degree is higher than a threshold;

the cellular phone transmits the user information including the pleasant keyword to the management apparatus; and to the in-vehicle apparatus, the management apparatus preferentially transmits the facility-event information that is classified in one of the attribute groups, the one having the attribute in common with the pleasant keyword.

20. The information providing system according to claim 18, wherein:

the cellular phone regards the keyword as a pleasant keyword when the speech in the telephone call in extraction of the keyword shows a waveform pattern indicating that a pleasant degree is higher than a threshold;

the cellular phone transmits the user information including the pleasant keyword to the management apparatus; and the management apparatus sets the weighting factor of each attribute group according a count of pleasant keyword in the management table.

21. The information providing system according to claim 19, wherein:

the facility-event information includes phone-source information provided from the cellular phone;

the database stores a user ID corresponding to each provider of the facility-event information to associate the user ID with the facility-event information;

other party in the telephone call in the extraction of the pleasant keyword is regarded as a values-sharing person by the cellular phone;

the cellular phone transmits the user information including information for identification of the values-sharing person to the management apparatus;

based on the user information received from the cellular phone, the management apparatus extracts, from the database, the facility-event information matching the values-sharing person when the values-sharing person is stored in the database as the provider of the facility-event information; and to the in-vehicle apparatus, the management apparatus preferentially transmits the extracted facility-event information matching the values-sharing person.

22. The information providing system according to claim 18, wherein:

to the management apparatus, the cellular phone transmits the user information including an amount of payment for an commercial product when the commercial product is associated with the keyword and the cellular phone is used to settle the payment; and the management apparatus sets the weighting factor of each attribute group according the amount of payment.

23. The information providing system according to claim 18, wherein:

to the management apparatus, the cellular phone transmits the user information including a date and hours when the keyword was extracted;

the management apparatus records the date and hours when the keyword was extracted in the management table in conjunction with the keyword; and at a specific season corresponding to the date of extraction of the keyword, the management apparatus transmits to the in-vehicle apparatus the facility—event information classified in one of the attribute groups that has the attribute in common with the keyword.

24. The information providing system according to claim 18, wherein:

the cellular phone transmits the user information including a time of day of extraction of the keyword to the management apparatus; and at a specific time of day corresponding to the time of day of extraction of the keyword, the management apparatus transmits to the in-vehicle apparatus the facility information classified in one of the attribute groups that has the attribute in common with the keyword.

25. An information providing system for providing information about a facility or an event as facility-event information, the information providing system comprising:

a management apparatus that includes a database, wherein the database stores facility-event information for a plurality of facilities or a plurality of events by associating the facility-event information with respective location data of the facilities or the events; and an in-vehicle apparatus that is mounted to a vehicle and communicable with the management apparatus, wherein:

the in-vehicle apparatus acquires present position information indicating present position of the vehicle, transmits vehicle source information, which is based on the present position information, to the management apparatus, and provides a user, who drives the vehicle, with at least one of the facility-event information transmitted from the management apparatus;

the management apparatus sets, based on the vehicle source information transmitted from the in-vehicle apparatus, a search scope parameterized by the location data, extracts the facility-event information matching the search scope from the database, and transmits the extracted facility-event information to the in-vehicle apparatus;

the in-vehicle apparatus measures a parking time of the vehicle, sets a stay place of the user based on the present position information and the parking time of the vehicle, wherein the stay place is a place at which the parking time exceeds a prescribed staying time, and sets a daily-visiting place of the user based on an acquisition date and time of the present position information, wherein the daily-visiting place is the stay place at which the vehicle is periodically parked;

based on respective location data corresponding to the stay places and the daily-visiting places, the in-vehicle apparatus estimates that a living area of the user is a collective area covering all of the stay places of the user is estimates that a daily-living area of the user is a collective area covering all of the daily-visiting places of the user, estimates that a non-daily-living area is the living area of the user except the daily-living area, transmit place information indicative of the daily-living area and the non-daily-living area to the management apparatus; and the management apparatus acquires the present position information from the in-vehicle apparatus, and sets the search scope based on the present position information and the place information received from the in-vehicle apparatus, by setting the daily-living area as the search scope when the present position of the vehicle is within the daily-living area of the user, and setting the non-daily-living area as the search scope when the present position of the vehicle is within the non-daily-living area of the user.

26. An apparatus mounted to a vehicle for providing information about a facility or an event as facility-event information, the apparatus comprising:

an information storage that includes a database, wherein the database stores facility-event information for a plurality of facilities or a plurality of events by associating the facility-event information with respective location data of the facilities or the events; and a present position acquisition unit that acquires present position information indicating present position of the vehicle, a search scope setting unit that sets a search scope parameterized by the location data, based on the present position information acquired by the present position acquisition unit;

an information extraction unit that extracts, from the information storage, the facility-event information that match the search scope set by the search scope setting unit;

an information indicating unit that provides a user, who drives the vehicle, with at least one of the facility-event information extracted by the information extraction unit; and a stay place setting unit that measures, based on the present position information acquired by the present position acquisition unit, a movement stop time defined as a period of time from when movement of the apparatus stops to when the movement of the apparatus restarts, and sets a stay place of the user based on the present position information and the movement stop time of the vehicle, wherein the stay place is a place at which the movement stop time exceeds a prescribed stop time, sets a daily-visiting place of the user based on an acquisition date and time of the present position information, wherein the daily-visiting place is the stay place at which the vehicle is periodically parked, wherein:

based on respective location data corresponding to the stay places and the daily-visiting places set by the stay place setting unit, the search scope setting unit estimates that a living area of the user is a collective area covering all of the stay places of the user, estimates that a daily-living area of the user is a collective area covering all of the daily-visiting places of the user, estimates that a non-daily-living area is the living area of the user except the daily-living area, and sets the search scope based on the present position information acquired by the present position acquisition unit, by setting the daily-living area as the search scope when the present position of the vehicle is within the daily-living area of the user, and setting the non-daily-living area as the search scope when the present position of the vehicle is within the non-daily-living area of the user.

* * * * *